US012120713B2

(12) United States Patent
Yeo et al.

(10) Patent No.: US 12,120,713 B2
(45) Date of Patent: Oct. 15, 2024

(54) DATA COMMUNICATION METHOD AND DEVICE USING MULTIPLE MCS IN WIRELESS COMMUNICATION SYSTEM

(71) Applicant: Samsung Electronics Co., Ltd., Suwon-si (KR)

(72) Inventors: Jeongho Yeo, Suwon-si (KR); Younsun Kim, Suwon-si (KR); Hyunseok Ryu, Suwon-si (KR); Sungjin Park, Suwon-si (KR); Jonghyun Bang, Suwon-si (KR); Cheolkyu Shin, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 17/271,920

(22) PCT Filed: Sep. 4, 2019

(86) PCT No.: PCT/KR2019/011428
§ 371 (c)(1),
(2) Date: Feb. 26, 2021

(87) PCT Pub. No.: WO2020/050631
PCT Pub. Date: Mar. 12, 2020

(65) Prior Publication Data
US 2021/0321414 A1    Oct. 14, 2021

(30) Foreign Application Priority Data
Sep. 7, 2018  (KR) ........................ 10-2018-0107386

(51) Int. Cl.
*H04W 72/53* (2023.01)
*H04L 1/00* (2006.01)
(Continued)

(52) U.S. Cl.
CPC ........... *H04W 72/53* (2023.01); *H04L 1/0004* (2013.01); *H04L 1/1819* (2013.01); *H04W 72/0453* (2013.01); *H04W 72/23* (2023.01)

(58) Field of Classification Search
CPC ............. H04W 72/53; H04W 72/0453; H04W 72/23; H04L 1/0004; H04L 1/1819;
(Continued)

(56) References Cited

U.S. PATENT DOCUMENTS 10,075,309 B2   9/2018  Chen et al.
10,841,944 B2  11/2020  Noh et al.
(Continued)

FOREIGN PATENT DOCUMENTS

CN   101379747 A   3/2009
CN   103069763 A   4/2013
(Continued)

OTHER PUBLICATIONS

Korean Office Action dated Sep. 22, 2022, issued in Korean Patent Application No. 10-2018-0107386.
(Continued)

*Primary Examiner* — Khaled M Kassim
*Assistant Examiner* — Oladiran Gideon Olaleye
(74) *Attorney, Agent, or Firm* — Jefferson IP Law, LLP

(57) ABSTRACT

The disclosure provides a method, performed by a base station, of transmitting or receiving data, the method including: determining whether to respectively allocate a plurality of transport blocks to different resource regions, based on channel information; determining, based on a result of the determining, a resource region to which the plurality of transport blocks are allocated and a modulation and coding scheme of the plurality of transport blocks; and transmitting, to a terminal, first downlink control information including an indicator of a transmission mode which indicates whether
(Continued)

the plurality of transport blocks are allocated to different resource regions and resource allocation information of a resource region to which the plurality of transport blocks are allocated.

20 Claims, 17 Drawing Sheets

(51) Int. Cl.
  *H04L 1/1812* (2023.01)
  *H04W 72/0453* (2023.01)
  *H04W 72/23* (2023.01)
(58) Field of Classification Search
  CPC ............... H04L 1/0025; H04L 1/0005; H04L 1/0011; H04L 1/1896; H04L 5/0053; H04L 5/0055; H04L 5/0091; H04L 1/1887; H04L 1/0023; H04L 1/0003; H04L 1/0013; H04L 1/0056; H04L 1/1812
  USPC ........................................................ 370/329
  See application file for complete search history.

(56) References Cited

U.S. PATENT DOCUMENTS

| | | | |
|---|---|---|---|
| 2007/0153672 A1 | 7/2007 | Terry et al. | |
| 2012/0320852 A1 | 12/2012 | Seo et al. | |
| 2013/0114570 A1 | 5/2013 | Park et al. | |
| 2015/0092645 A1* | 4/2015 | Tabet | H04L 1/1812 370/311 |
| 2016/0198508 A1* | 7/2016 | Lee | H04W 72/02 370/329 |
| 2018/0109353 A1 | 4/2018 | Kwak et al. | |
| 2018/0176892 A1 | 6/2018 | Kim et al. | |
| 2019/0044646 A1 | 2/2019 | Xu et al. | |
| 2020/0267702 A1 | 8/2020 | Kim et al. | |

FOREIGN PATENT DOCUMENTS

| | | | | |
|---|---|---|---|---|
| CN | 106165510 A | | 11/2016 | |
| EP | 2 472 981 A1 | | 7/2012 | |
| KR | 20130130097 A | * | 12/2006 | |
| KR | 10-2012-0010099 A | | 2/2012 | |
| KR | 10-2013-0130097 A | | 11/2013 | |
| KR | 10-2016-0147756 A | | 12/2016 | |
| KR | 10-2018-0050202 A | | 5/2018 | |
| WO | 2007/079058 A2 | | 7/2007 | |
| WO | WO-2011105845 A2 | * | 9/2011 | ........... H04L 5/0053 |
| WO | WO-2012161550 A2 | * | 11/2012 | ............. H04L 5/001 |
| WO | WO-2014123378 A1 | * | 8/2014 | ........... H04L 1/1812 |
| WO | 2015/152581 A1 | | 10/2015 | |
| WO | 2016/208991 A1 | | 12/2016 | |
| WO | WO-2017045180 A1 | * | 3/2017 | ............... H04L 1/00 |
| WO | WO-2017133552 A1 | * | 8/2017 | ........... H04L 1/0003 |
| WO | 2018/044849 A1 | | 3/2018 | |
| WO | WO-2018084595 A1 | * | 5/2018 | ........... H04B 17/318 |
| WO | 2018/128369 A1 | | 7/2018 | |

OTHER PUBLICATIONS

International Search Report dated Dec. 13, 2019, issued in International Patent Application No. PCT/KR2019/011428.
European Office Action dated Feb. 28, 2023, issued in European Patent Application No. 19857594.6.
Korean Office Action dated Mar. 29, 2023, issued in Korean Patent Application No. 10-2018-0107386.
Extended European Search Report dated Sep. 23, 2021, issued in European Patent Application No. 19857594.6.
Chinese Office Action dated Oct. 16, 2023, issued in Chinese Patent Application No. 201980070051.2.
European Notice of Allowance dated Feb. 19, 2024, issued in European Patent Application No. 19857594.6-1206.
Chinese Notice of Allowance dated May 17, 2024, issued in Chinese Patent Application No. 201980070051.2.

* cited by examiner

A. BLOCK DIAGRAM OF CHANNEL CODING WHERE OUTER CODE IS NOT USED

B. BLOCK DIAGRAM OF CHANNEL CODING WHERE OUTER CODE IS USED

DATA COMMUNICATION METHOD AND DEVICE USING MULTIPLE MCS IN WIRELESS COMMUNICATION SYSTEM

TECHNICAL FIELD

The disclosure relates to a wireless communication system, and more particularly to, to a method of transmitting data by using a plurality of modulation and coding schemes (MCSs).

BACKGROUND ART

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems.

To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology.

As various services can be provided due to the aforementioned technical features and development of wireless communication systems, there is a demand for a method for seamlessly providing the services.

DESCRIPTION OF EMBODIMENTS

Technical Problem

According to embodiments, provided are an apparatus and method for effectively providing a service in a wireless communication system.

Solution to Problem

According to embodiments, provided is a method of transmitting data by using a plurality of modulation and coding schemes (MCSs) in a wireless communication system.

Advantageous Effects of Disclosure

According to embodiments, services may be effectively provided in a mobile communication system.

BEST MODE

Figure 1:
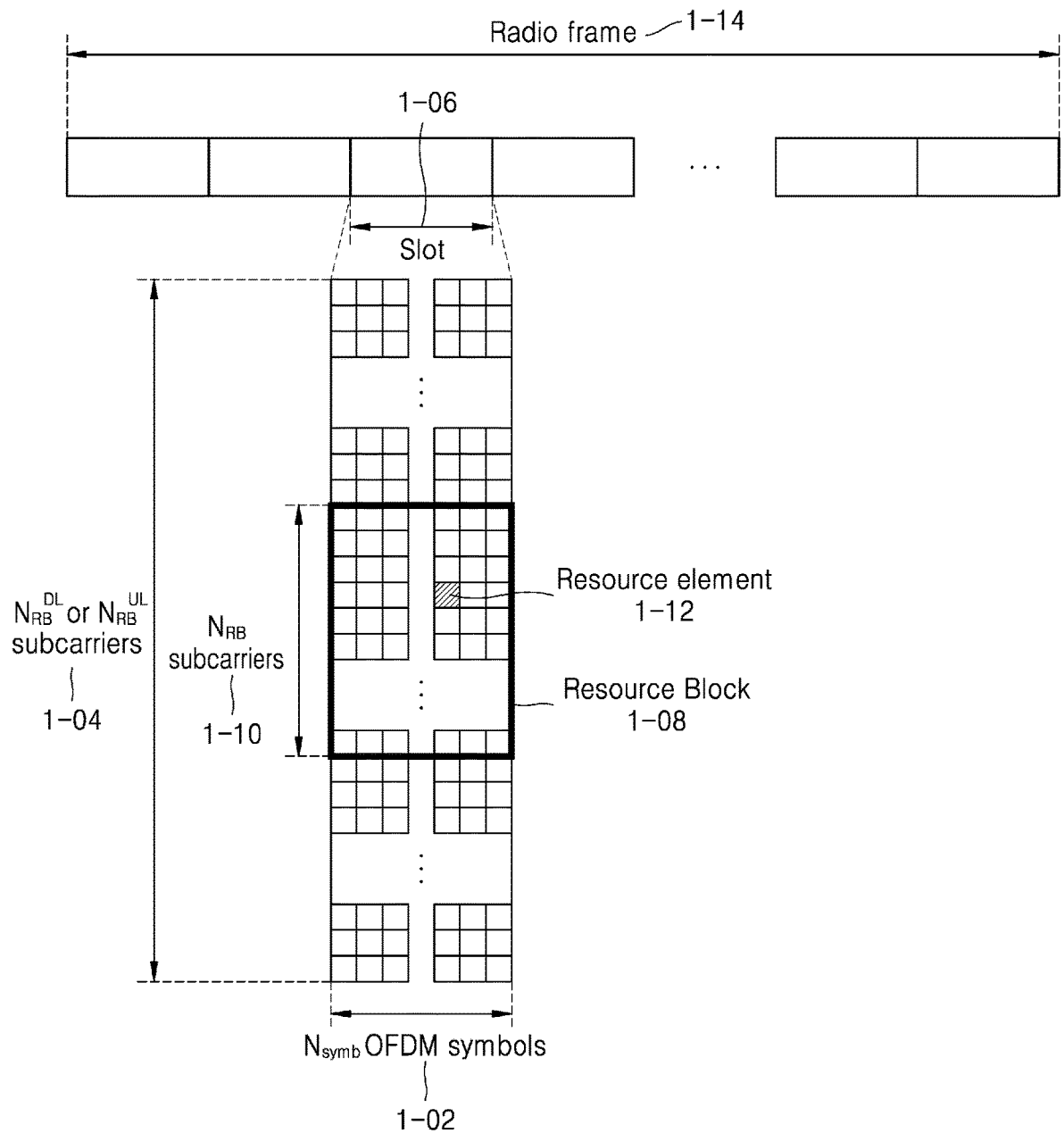
FIG. 1 is a diagram illustrating a downlink (DL) or uplink (UL) time-frequency domain transmission structure of a New Radio system, according to an embodiment of the disclosure.

According to an embodiment of the disclosure, a method, performed by a base station, of transmitting or receiving data may include: determining whether to respectively allocate a plurality of transport blocks to different resource regions, based on channel information; determining, based on a result of the determining, a resource region to which the plurality of transport blocks are allocated and a modulation and coding scheme of the plurality of transport blocks; and transmitting, to a terminal, first downlink control information including an indicator of a transmission mode which indicates whether the plurality of transport blocks are allocated to different resource regions and resource allocation information of a resource region to which the plurality of transport blocks are allocated.

The resource allocation information may include information of a frequency resource domain to which the plurality of transport blocks are allocated, and the first downlink control information may include at least one of information of a modulation and coding scheme of each of the plurality of transport blocks, a hybrid automatic repeat request (HARQ) process number, a new data indicator, and information of redundancy version.

When the plurality of transport blocks are allocated to different frequency resource domains, the information of the frequency resource domain may include M bits indicating a frequency domain to which one of the plurality of transport blocks is allocated, and when the plurality of transport blocks are allocated to a same frequency resource domain, the information of the frequency resource domain may include 2M bits indicating a frequency domain to which the plurality of transport blocks are allocated.

The first downlink control information may further include frequency domain information including second downlink control information, and the second downlink control information may include at least one of information of a frequency resource domain to which the plurality of transport blocks are allocated, information of a modulation and coding scheme of the plurality of transport blocks, a HARQ process number, a new data indicator, and information of redundancy version.

The determining of whether to respectively allocate the plurality of transport blocks to the different resource regions may include determining whether to respectively allocate the plurality of transport blocks to different layers, and the first downlink control information may further include information of a number of layers.

The indicator of the transmission mode may be determined based on information of a number of transport blocks transmitted on a Physical Downlink Shared Channel (PDSCH), and the transmission mode may be configured via higher layer signaling.

According to an embodiment of the disclosure, a method, performed by a terminal, of transmitting or receiving data may include: receiving, from a base station, first downlink control information; determining, based on the received first downlink control information, whether a plurality of transport blocks are respectively allocated to different resource regions; and identifying, based on a result of the determining, resource allocation information of a resource region to which the plurality of transport blocks are allocated.

The resource allocation information may include information of a frequency resource domain to which the plurality of transport blocks are allocated, and the first downlink control information may include at least one of information of a modulation and coding scheme of each of the plurality of transport blocks, a HARQ process number, a new data indicator, and information of redundancy version.

The identifying, based on the result of the determining, the resource allocation information of the resource region to which the plurality of transport blocks are allocated may include, when the plurality of transport blocks are allocated to different frequency resource domains, interpreting M bits indicating a frequency domain to which one of the plurality of transport blocks is allocated, based on 2N that is a frequency allocation unit, and when the plurality of transport blocks are allocated to a same frequency resource domain, interpreting 2M bits indicating a frequency domain to which the plurality of transport blocks are allocated, based on 2N that is a frequency allocation unit.

The first downlink control information may further include frequency domain information including second downlink control information, and the second downlink control information may include at least one of information of a frequency resource domain to which the plurality of transport blocks are allocated, information of a modulation and coding scheme of the plurality of transport blocks, a HARQ process number, a new data indicator, and information of redundancy version.

The determining, based on the received first downlink control information, of whether the plurality of transport blocks are respectively allocated to the different resource regions may include determining whether the plurality of transport blocks are respectively allocated to different layers, and the first downlink control information may further include information of a number of layers.

A base station for transmitting or receiving data may include: a transceiver; and at least one controller combined with the transceiver and configured to determine whether to respectively allocate a plurality of transport blocks to different resource regions, based on channel information, determine, based on a result of the determining, a resource region to which the plurality of transport blocks are allocated and a modulation and coding scheme of the plurality of transport blocks, and transmit, to a terminal, first downlink control information including an indicator of a transmission mode which indicates whether the plurality of transport blocks are allocated to different resource regions and resource allocation information of a resource region to which the plurality of transport blocks are allocated.

The first downlink control information may further include frequency domain information including second downlink control information, and the second downlink control information may include at least one of information of a frequency resource domain to which the plurality of transport blocks are allocated, information of a modulation and coding scheme of the plurality of transport blocks, a HARQ process number, a new data indicator, and information of redundancy version.

The controller may be configured to determine whether to respectively allocate the plurality of transport blocks to different layers, and the first downlink control information may further include information of a number of layers.

A terminal for transmitting or receiving data may include: a transceiver; and at least one controller combined with the transceiver and configured to receive, from a base station, first downlink control information, determine, based on the received first downlink control information, whether a plurality of transport blocks are respectively allocated to different resource regions, and identify, based on a result of the determining, resource allocation information of a resource region to which the plurality of transport blocks are allocated.

MODE OF DISCLOSURE

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. The 5G communication system defined in the $3^{rd}$ Generation Partnership Project (3GPP) is called a New Radio (NR) system. To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology.

A New Radio access technology that is new 5G communication is designed for various services to be freely multiplexed in time and frequency resources, such that waveform/numerology and a reference signal may be dynamically or freely allocated in response to necessity for a corresponding service. In order to provide an optimal service to a terminal in a wireless communication, optimized data communication through measurement of a quality and an amount of interference with respect to a channel is important, and thus, it is essential to exactly measure a channel condition. However, unlike 4G communication in which channel and interference characteristics are not significantly changed depending on frequency resources, channel and interference characteristics of 5G channels are significantly changed depending on services, such that there is a demand for support for subsets in view of Frequency Resource Groups (FRGs) for categorized measurements. Service types supported in the NR system may be categorized into Enhanced Mobile BroadBand (eMBB), massive Machine Type Communications (mMTC), Ultra-Reliable and Low-Latency Communications (URLLC), and the like. The eMBB refers to a service for high-speed transfer of a large amount of data, the mMTC refers to a service for minimization of power consumption of terminals and connection of a large number of terminals, and the URLLC refers to a service for ultra-reliability and low latency. Different requirements may be required according to service types applied to a terminal. Obviously, service types supported in the NR system are not limited to the above examples.

Recently, with the development in studies for a next-generation communication system, various schemes for scheduling communication with terminals are being discussed. Accordingly, efficient scheduling and data transmission/reception schemes based on characteristics of the next-generation communication system are required.

As described above, a plurality of services may be provided to a user in a communication system, and in order to provide the plurality of services to the user, there is a demand for an apparatus and method for providing the services in a same time domain according to characteristics of the services.

Hereinafter, embodiments of the disclosure will now be described more fully with reference to the accompanying drawings.

In the following descriptions of embodiments, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments of the disclosure.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the $3^{rd}$ Generation Partnership Project (3GPP), high rate packet data (HRPD) and ultra mobile broadband (UMB) of 3GPP2, 802.16e of the Institute of Electrical and Electronic Engineers (IEEE), or the like. As a 5G wireless communication system, 5G or NR wireless communication systems are being established.

As a representative example of the broadband wireless communication system, the NR system adopts an orthogonal frequency division multiplexing (OFDM) scheme in a downlink (DL) and an uplink (UL). More particularly, a Cyclic-Prefix OFDM (CP-OFDM) scheme has been adopted in a DL, and two schemes of Discrete Fourier Transform Spreading OFDM (DFT-S-OFDM) and CP-OFDM have been adopted in a UL. The UL refers to a radio link through which a user equipment (UE) or a mobile station (MS) transmits data or a control signal to a next-generation node B (gNode B) or a base station (BS), and the DL refers to a radio link through which a BS transmits data or a control signal to a UE. The above-described multiple access schemes identify data or control information of different users in a manner that time-frequency resources for carrying the data or control information of the users are allocated and managed not to overlap each other, that is, to achieve orthogonality therebetween.

The NR system has adopted a hybrid automatic repeat request (HARQ) scheme of retransmitting data at a physical layer when a decoding failure occurs in initial transmission. The HARQ scheme indicates that, when a receiver fails to correctly decode data, the receiver transmits decoding failure indication information (e.g., negative acknowledgement (NACK)) to a transmitter so as to allow the transmitter to retransmit the data at its physical layer. The receiver may combine the data, which is retransmitted by the transmitter, with data previously failed in decoding, thereby increasing data reception performance. Also, when the receiver correctly decodes the data, the transmitter transmits decoding success indication information (e.g., acknowledgement (ACK)) to the transmitter so as to allow the transmitter to transmit new data.

The disclosure relates to a wireless communication system, and in this regard, descriptions are provided for a method for increasing a data rate by performing scheduling according to a channel condition by using a plurality of modulation and coding schemes (MCSs) in transmission of data.

A transmission scheme using two MCSs which is currently supported in LTE and NR involves transmitting two transport blocks (TBs) by using a same frequency resource, and in the disclosure, provided is a method of increasing a transfer rate by dividing a particular frequency band and selecting a MCS according to each of the divided frequency bands. For example, a BS or a node which performs scheduling may divide a frequency band into a sub-band of a great signal-to-noise ratio (SNR) and a sub-band of a small SNR and may perform scheduling by respectively using a high MCS and a low MCS. A method of performing scheduling according to a channel condition by using a plurality of MCSs according to the disclosure may increase a data rate.

FIG. 1 is a diagram illustrating a basic structure of a time-frequency domain that is a radio resource region over which data or a control channel is transmitted in a DL or a UL in a NR system, according to an embodiment of the disclosure.

Referring to FIG. 1, the horizontal axis represents a time domain and the vertical axis represents a frequency domain. A minimum transmission unit in the time domain is an OFDM symbol, and $N_{symb}$ OFDM symbols 1-02 may be gathered to constitute one slot 1-06. A length of a subframe is defined as 1.0 ms, and a radio frame 1-14 is defined as 10 ms. A minimum transmission unit in the frequency domain is a subcarrier, and $N_{BW}$ subcarriers 1-04 may be gathered to constitute a whole system transmission bandwidth.

A basic unit of a resource in the time-frequency domain is a resource element (RE) 1-12 and may be defined as an OFDM symbol index and a subcarrier index. A resource block (RB) 1-08 or a physical resource block (PRB) may be defined as $N_{symb}$ consecutive OFDM symbols 1-02 in the time domain and $N_{RB}$ consecutive subcarriers 1-10 in the frequency domain. Therefore, one RB 1-08 is composed of $N_{symb} \times N_{RB}$ REs 1-12. In general, a minimum transmission unit of data is a RB unit. In the NR system, $N_{symb}=14$, $N_{RB}=12$, and $N_{BW}$ and $N_{RB}$ may be proportional to a bandwidth of a system transmission band. However, the disclosure is not limited to the above example.

According to an embodiment, a data rate may be increased in proportion to the number of RBs scheduled to a terminal. In the NR system, a DL transmission bandwidth and a UL transmission bandwidth may be different from each other in a FDD system that operates by distinguishing between a DL and a UL based on frequencies. A channel bandwidth refers to a radio frequency (RF) bandwidth corresponding to a system transmission bandwidth. Table 1 shows a correspondence relation between a system transmission bandwidth and a channel bandwidth, which is defined in the LTE system that is a 4G wireless communication prior to the NR system. For example, a transmission bandwidth of the LTE system having a channel bandwidth of 10 MHz consists of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The NR system may operate in a channel bandwidth wider than the channel bandwidth of the LTE shown in Table 1.

In the NR system, scheduling information on DL data or UL data is transmitted from a BS to a terminal via Downlink Control Information (DCI). The DCI is defined according to various formats, and may indicate, according to the formats, whether it is scheduling information on UL data (UL grant), whether it is scheduling information on DL data (DL grant), whether it is compact DCI in which a size of control information is small, whether spatial multiplexing using multiple antennas is to be applied, or whether it is DCI for power control, or the like. For example, DCI format 1-1 that is scheduling information on DL data (DL grant) may include one of a plurality of pieces of control information as below. However, the disclosure is not limited to examples below.

Carrier indicator: An indicator to indicate on which frequency carrier transmission is performed.

DCI format indicator: An indicator to identify whether corresponding DCI is for DL or UL.

Bandwidth part (BWP) indicator: An indicator to indicate on which BWP transmission is performed.

Frequency domain resource allocation:) indicates a RB of a frequency domain allocated to transmission of data. Representation of a resource is determined according to a system bandwidth and a resource allocation scheme.

Time domain resource allocation: indicates on which OFDM symbol and which slot a channel related to data is to be transmitted.

VRB-to-PRB mapping: indicates which scheme is to be used in mapping a virtual RB (VRB) and a physical RB (PRB).

Modulation and coding scheme (MCS): indicates a modulation scheme and a coding rate used in transmission of data. That is, information about whether it is QPSK, 16QAM, 64QAM, or 256QAM, and a coding rate value capable of indicating TBS and channel coding information may be indicated.

Codeblock group (CBG) transmission information: An indicator to indicate, when CBG retransmission is configured, information about which CBG is to be transmitted.

HARQ process number: indicate a process number of HARQ.

New data indicator: An indicator to indicate whether it is HARQ initial transmission or retransmission.

Redundancy version: indicates a redundancy version of HARQ.

Transmit Power Control (TPC) command) for Physical Uplink Control Channel (PUCCH): An indicator to indicate a TPC command for a PUCCH that is a UL control channel.

For PUSCH transmission, time domain resource assignment may be indicated by using information of a slot on which a PUSCH is transmitted, and S that is a start symbol position in the slot and L that is the number of symbols to which the PUSCH is mapped. S may be a relative position from a start of the slot, L may be a consecutive number of symbols, and S and L may be determined from a start and length indicator value (SLIV) defined as below.

if (L−1)≤7 then $$SLIV=14 \cdot (L-1)+S$$

else $$SLIV=14 \cdot (14-L+1)+(14-1-S)$$

where 0<L≤14−S

Also, according to an embodiment, in the NR system, Table including information of a SLIV value, a PUSCH mapping type, and a slot on which PUSCH is transmitted is included in one row may be configured via Radio Resource Control (RRC) configuration. Then, time domain resource assignment of DCI indicates an index value of configured Table, and by doing so, the BS can transmit, to the terminal, the information of a SLIV value, a PUSCH mapping type, and a slot on which PUSCH is transmitted.

According to an embodiment, in the NR system, the PUSCH mapping type is defined as type A and type B. In a PUSCH mapping type A, a first symbol among DMRS symbols is positioned in a second or third OFDM symbol of a slot. In a PUSCH mapping type B, a first symbol among DMRS symbols is positioned in a first OFDM symbol in a time domain resource allocated for PUSCH transmission.

DCI may undergo a channel coding and modulation process and then may be transmitted on a physical downlink control channel (PDCCH) (or control information that is interchangeably used hereinafter).

The DCI may be scrambled by a particular Radio Network Temporary Identifier (RNTI) (or a terminal identifier) independently with respect to each terminal, may be added with a cyclic redundancy check (CRC), may be channel-coded, and then may be configured as an independent PDCCH to be transmitted. The PDCCH may be mapped in a Control Resource SET (CORESET) configured to the terminal, and may be transmitted.

DL data may be transmitted on a Physical Downlink Shared Channel (PDSCH) that is a physical channel for transmission of DL data. The PDSCH may be transmitted after a control channel transmission interval, and scheduling information, such as a concrete mapping position or a modulation scheme in the frequency domain, may be determined based on the DCI transmitted on the PDCCH.

The BS may notify the terminal of a modulation scheme applied to the PDSCH to be transmitted and a size of data to be transmitted (transport block size (TBS)) through a MCS in the control information configuring the DCI. According to some embodiments, the MCS may be composed of 5 bits, or may be composed of bits less than or greater than 5 bits. The TBS corresponds to a size before channel coding for error correction is applied to data (TB) to be transmitted by the BS.

According to an embodiment of the disclosure, data in a TB to be transmitted may include a Medium Access Control (MAC) header, a MAC control element (MAC CE), one or more MAC Service Data Units (MAC SDUs), and padding bits. Alternatively, a TB may refer to a data unit or a MAC Protocol Data Unit (MAC PDU) provided from a MAC layer to a physical layer.

The modulation scheme supported in the NR system is quadrature phase shift keying (QPSK), 16 quadrature amplitude modulation (QAM), 64QAM, or 256QAM and respective modulation orders (Qm) correspond to 2, 4, 6, and 8. In other words, 2 bits per symbol may be transmitted in QPSK, 4 bits per symbol may be transmitted in 16QAM, 6 bits per symbol may be transmitted in 64QAM and 8 bits per symbol may be transmitted in 256QAM.

Figure 2:
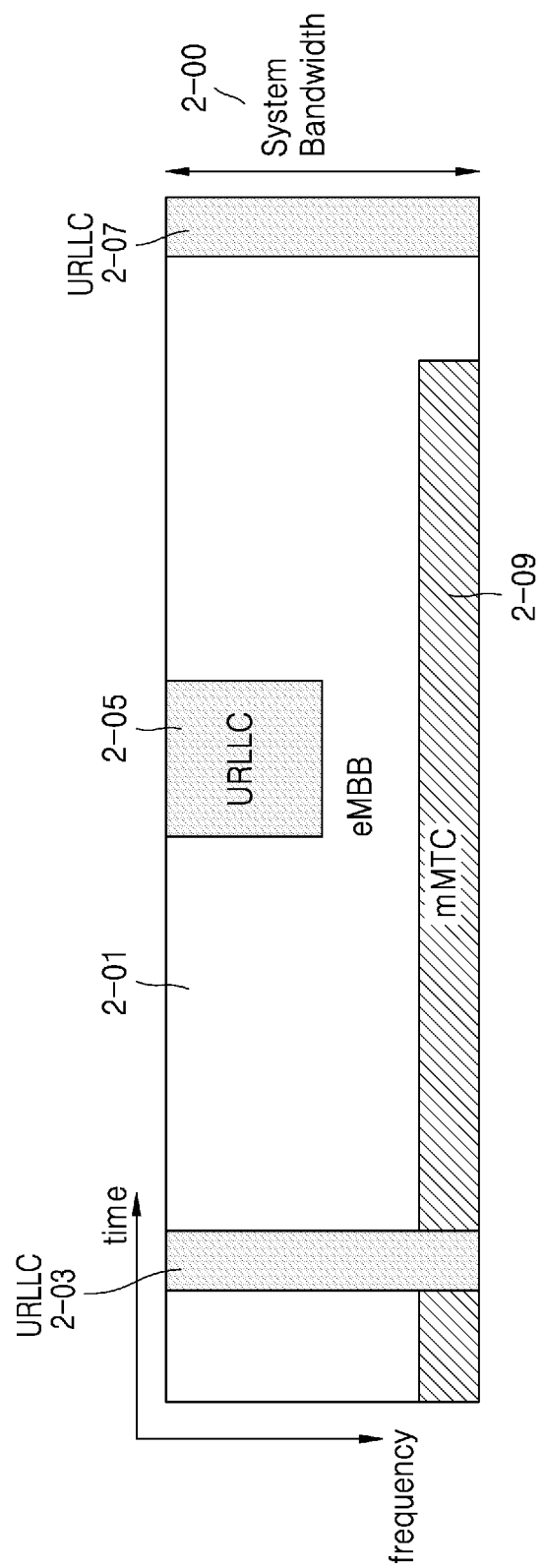
FIG. 2 illustrates that a plurality of pieces of data for Enhanced Mobile BroadBand (eMBB), Ultra-Reliable and Low-Latency Communications (URLLC), and massive Machine Type Communications (mMTC) are allocated to frequency-time resources in a communication system, according to an embodiment of the disclosure.
Figure 3:
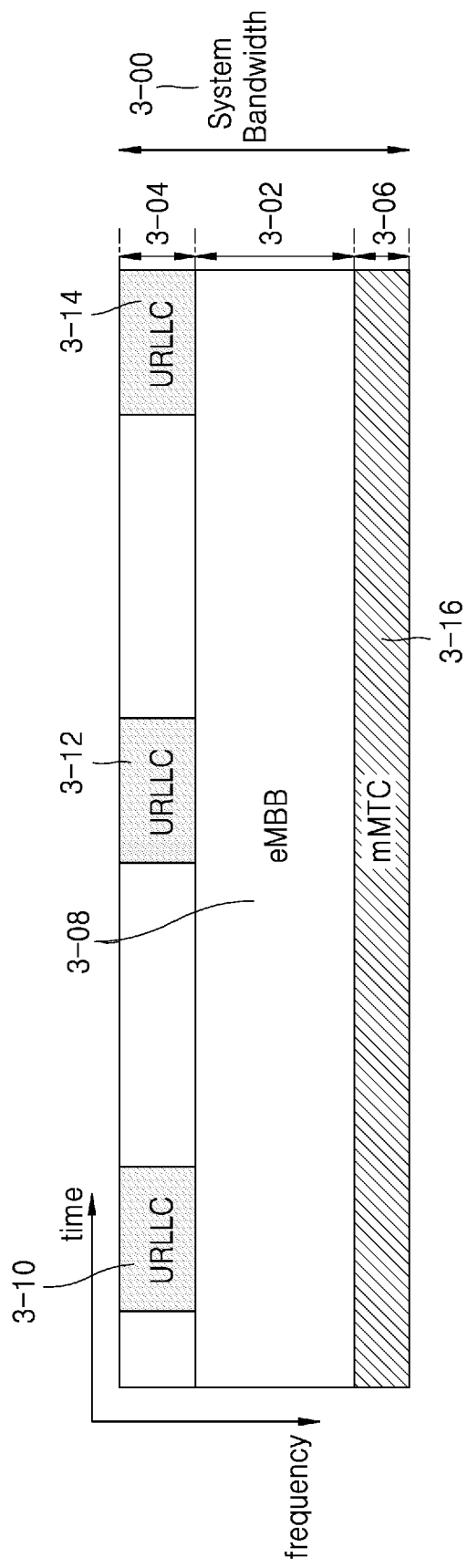
FIG. 3 illustrates that a plurality of pieces of data for eMBB, URLLC, and mMTC are allocated to frequency-time resources in a communication system, according to an embodiment of the disclosure.

FIGS. 2 and 3 illustrate that a plurality of pieces of data for eMBB, URLLC, and mMTC services considered in the 5G or NR system are allocated in frequency-time resources, according to an embodiment.

Referring to FIGS. 2 and 3, how frequency and time resources are allocated for transmission of information in each system is shown.

FIG. 2 illustrates allocation of data for eMBB 2-01, URLLC, and mMTC 2-09 in a whole system frequency band 2-00. While the eMBB 2-01 and the mMTC 2-09 are allocated in a particular frequency band and are transmitted, when a plurality of pieces of URLLC data 2-03, 2-05, and 2-07 occur to be transmitted, the plurality of pieces of URLLC data 2-03, 2-05, and 2-07 may be transmitted without transmitting or emptying allocated portions for the eMBB 2-01 and the mMTC 2-09. Because it is necessary for URLLC among services to reduce latency, URLLC data may be allocated to portions 2-03, 2-05, and 2-07 of a resource 2-01 to which eMBB is allocated and may be transmitted. Obviously, when URLLC is additionally allocated and transmitted on a resource to which eMBB is allocated, eMBB data may not be transmitted on an overlapping frequency-time resource, and thus transmission performance of the eMBB data may be decreased. That is, in FIG. 2, an eMBB data transmission failure due to allocation of URLLC may occur.

In FIG. 3, a whole system frequency band 3-00 may be divided into sub-bands 3-02, 3-04, and 3-06 to be used in transmission of services and data. Sub-band configuration information may be preset and may be transmitted from a BS to a terminal via higher layer signaling. Also, according to an embodiment, the BS or a network node may randomly divide a whole system frequency band, and may provide services without separately transmitting sub-band configuration information to the terminal. FIG. 3 illustrates that the sub-band 3-02 is used in transmission of eMBB data, the sub-band 3-04 is used in transmission of URLLC data, and the sub-band 3-06 is used in transmission of mMTC data.

According to an embodiment, a length of a transmission time interval (TTI) used in URLLC transmission may be shorter than a length of a TTI used in eMBB or mMTC transmission. Also, a response to information related to URLLC may be transmitted faster than eMBB or mMTC, such that the information may be transmitted and received with low latency. A physical layer channel structure used for each of types to transmit the aforementioned three services or data may vary. For example, at least one of a length of a TTI of a physical layer channel, an allocation unit of a frequency resource, a control channel structure, and a data mapping method, which are used for each type to transmit the aforementioned three services or data, may vary.

While three services and three types of data are described above, more service types and data corresponding thereto may exist, and content of the disclosure may also be applied thereto.

Also, in order to describe a method and apparatus proposed in embodiments of the disclosure, the terms of physical channel and signal in the NR system may be used. However, content of the disclosure may be applied not only to the NR system but also applied to a wireless communication system.

Figure 4:
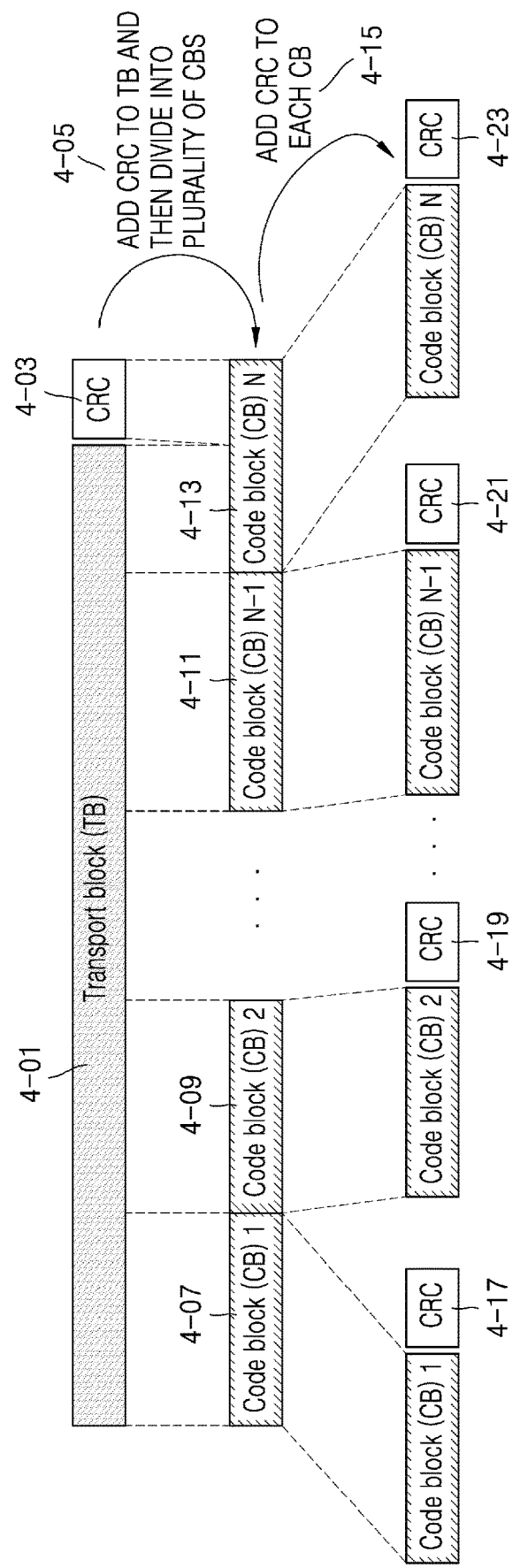
FIG. 4 illustrates a procedure in which one transport block (TB) is divided into a plurality of codeblocks and a Cyclic Redundancy Check (CRC) is added thereto, according to an embodiment of the disclosure.

FIG. 4 illustrates a procedure in which one TB is divided into a plurality of codeblocks and a CRC is added thereto, according to an embodiment.

Referring to FIG. 4, one TB 4-01 to be transmitted in a UL or DL may be added with a CRC 4-03 at its header or tail. The CRC may have 16 bits, 24 bits, or a prefixed number of bits, or may have bits varying depending on a channel condition, or the like, and may be used in determination of whether channel coding is successful.

A block to which the TB 4-01 and the CRC 4-03 are added may be divided into a plurality of codeblocks (CBs) 4-07, 4-09, 4-11, and 4-13 (operation 4-05). A maximum size of divided CBs may be prefixed, and a last CB 4-13 may be smaller than other CBs, or 0, a random value, or 1 may be inserted to the last CB 4-13 so as to make a same length as other CBs. CRCs 4-17, 4-19, 4-21, and 4-23 may be respectively added to the divided CBs (operation 4-15). A CRC may have 16 bits, 24 bits, or a prefixed number of bits, and may be used in determination of whether channel coding is successful.

According to an embodiment, the TB 4-01 and cyclic generator polynomial may be used to generate the CRC 4-03, and the cyclic generator polynomial may be defined in various ways. For example, assuming that cyclic generator polynomial for a 24-bit CRC is $g_{CRC24A}(D)=D^{24}+D^{23}+D^{18}+D^{17}+D^{14}+D^{11}+D^{10}+D^7+D^6+D^5+D^4+D^3+D+1$, and L=24, for TB data $a_0, a_1, a_2, a_3, \ldots, a_{A-1}$, CRC $p_0, p_1, p_2, p_3, \ldots, p_{L-1}$ may be determined to be a value with a remainder of 0 which is obtained by dividing $a_0D^{A+23}+a_1D^{A+22}+\ldots+a_{A-1}D^{24}+p_0D^{23}+p_1D^{22}+\ldots+p_{22}D^1+p_{23}$ by $g_{CRC24A}(D)$. In the above, a CRC length L is described as 24, but the disclosure is not limited to the example, and the CRC length may be determined to be any of various lengths including 12, 16, 24, 32, 40, 48, 64, or the like.

As described above, a CRC is added to a TB, and the CRC and the TB are divided into N CBs 4-07, 4-09, 4-11, and 4-13. CRCs 4-17, 4-19, 4-21, and 4-23 are respectively added to the divided CBs 4-07, 4-09, 4-11, and 4-13 (operation 4-15). A different-length CRC or a different cyclic generator polynomial, compared to the CRC added to the TB, may be used for the CRCs 4-17, 4-19, 4-21, and 4-23 that are respectively added to the divided CBs 4-07, 4-09, 4-11, and 4-13. However, at least one of the CRC 4-03 added to the TB and the CRCs 4-17, 4-19, 4-21, and 4-23 added to the CBs may be skipped according to a type of a channel code to be applied to a CB. For example, when a low-density parity-check (LDPC) code, not turbo code, is to be applied to the CBs, the CRCs 4-17, 4-19, 4-21, and 4-23 to be added to the CBs may be skipped. However, even when the LDPC is applied, the CRCs 4-17, 4-19, 4-21, and 4-23 may be added to the CBs. Also, when a polar code is used, a CRC may be added or skipped.

As illustrated in FIG. 4, a maximum length of one CB is determined according to a type of channel coding to be applied to a TB to be transmitted, and according to the maximum length of the CB, the TB and a CRC added to the TB are divided into a plurality of CBs. In the legacy LTE system, a CRC for CB is added to a divided CB, and a data bit of the CB and the CRC are encoded with a channel code to determine coded bits, and each of the coded bits is rate matched in a predetermined manner such that a bit number may be determined.

Figure 5:
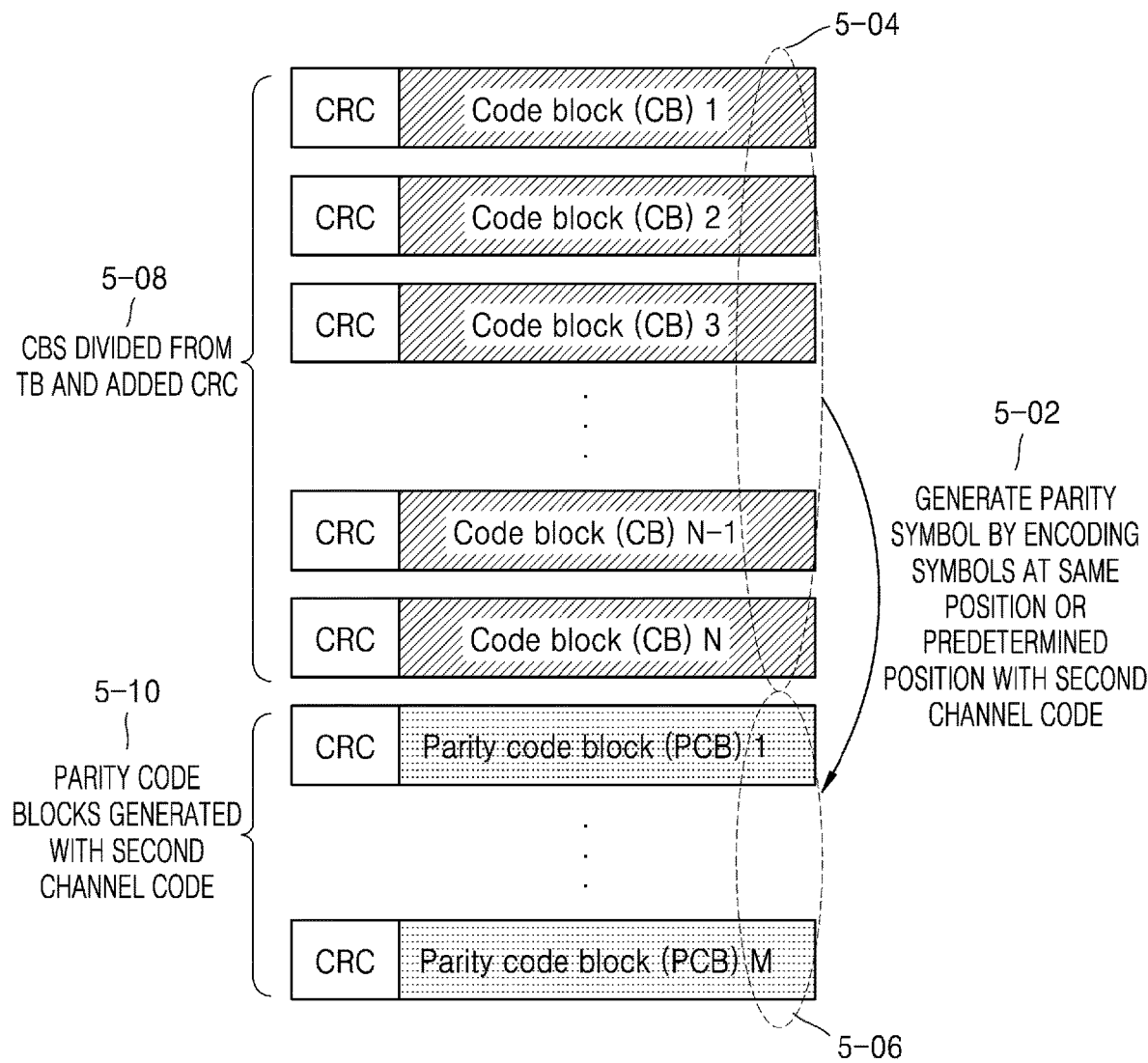
FIG. 5 is a diagram illustrating an example in which coding is performed by applying outer code, according to an embodiment of the disclosure.
Figure 6:
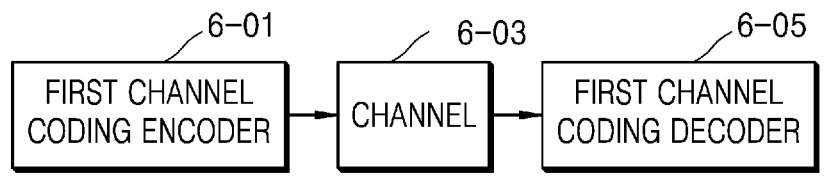
FIG. 6 is a block diagram of cases according to whether or not outer code is applied, according to an embodiment of the disclosure.
Figure 6:
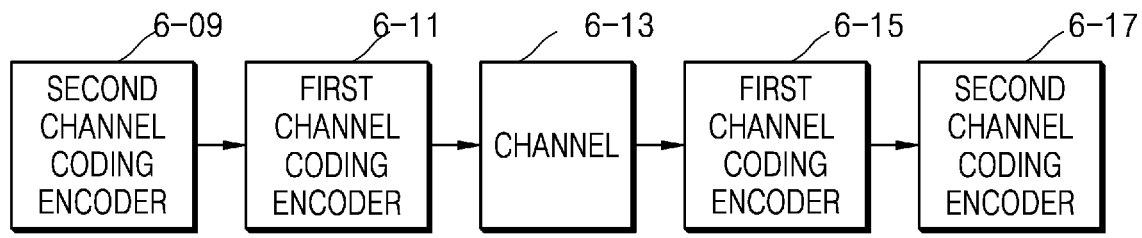

FIG. 5 is a diagram illustrating a transmission scheme using outer code, according to an embodiment, and FIG. 6 is a block diagram illustrating a configuration of a communication system in which outer code is used. With reference to FIGS. 5 and 6, a method of transmitting a signal by using outer code will now be described.

In FIG. 5, one TB is divided into a plurality of CBs, and bits or symbols 5-04 at a same position in CBs are encoded with a second channel code to generate parity bits or symbols 5-06 (operation 5-02). Afterward, CRCs 5-08 and 5-10 may be respectively added to parity code blocks generated by encoding the CBs with the second channel code. Whether to add a CRC may vary according to a type of channel code. For example, when turbo code is used as a first channel code, the CRCs 5-08 and 5-10 may be added, but afterward, each of CBs and parity code blocks may be encoded with first channel code encoding. In the disclosure, the first channel code may refer to convolutional code, LDPC code, turbo code, polar code, or the like. However, the disclosure is not limited thereto, and various channel codes may be applied to the disclosure. In the disclosure, the second channel code may refer to Reed-Solomon code, BCH code, Raptor code, parity bit generation code, or the like. However, the disclosure is not limited thereto, and various channel codes may be applied as the second channel code to the disclosure.

According to an embodiment, when outer code is used (e.g., (b) of FIG. 6), data to be transmitted passes through a second channel coding encoder 6-09. A bit or symbols that passed through the second channel coding encoder 6-09 passes through a first channel coding encoder 6-11. Channel-coded symbols that passed through the first channel coding encoder 6-11 passes through a channel 6-13 and are received by a receiver, and the receiver may sequentially operate a first channel coding decoder 6-15 and a second channel coding decoder 6-17, based on a received signal. The first channel coding decoder 6-15 and the second channel coding decoder 6-17 may perform operations that respectively correspond to the first channel coding encoder 6-11 and the second channel coding encoder 6-09.

Also, according to an embodiment, in a block diagram (i.e., (a) of FIG. 6) of channel coding where outer code is not used, only the first channel coding encoder 6-11 and the first channel coding decoder 6-15 are respectively used in a transmitter and a receiver, and a second channel coding encoder and a second channel coding decoder are not used. Even when outer code is not used, the first channel coding encoder 6-11 and the first channel coding decoder 6-15 may be equally configured as in a case where outer code is used.

Figure 7:
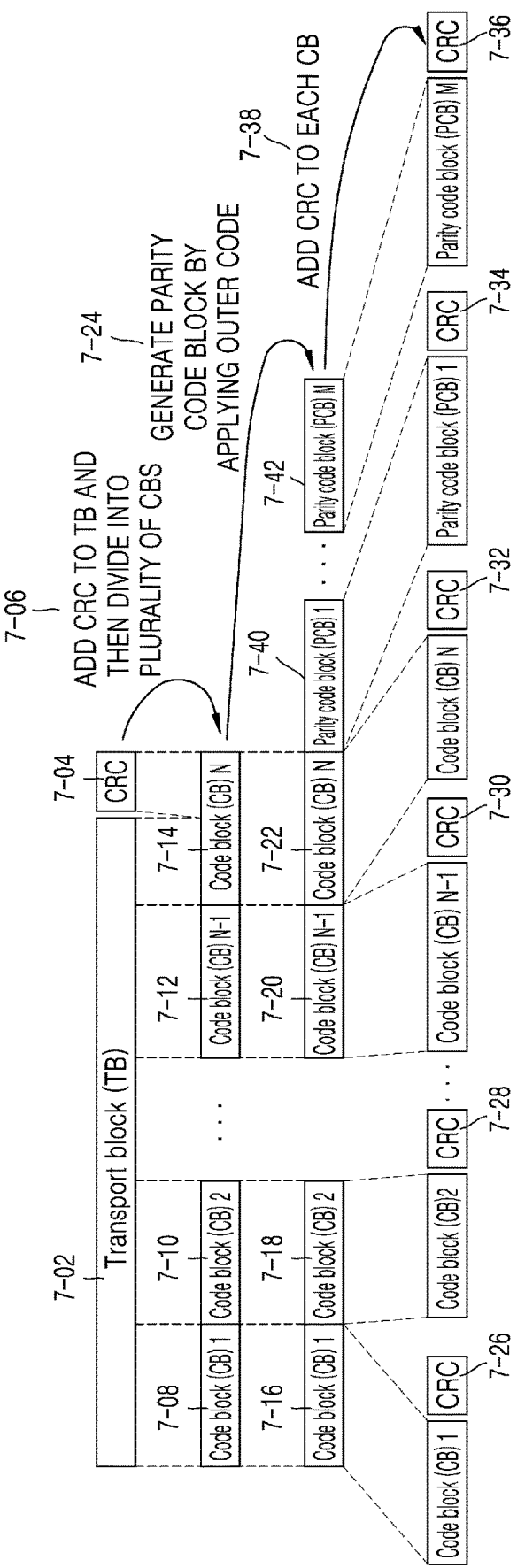
FIG. 7 illustrates an example in which one TB is divided into a plurality of codeblocks (CBs), and outer code is applied to the CBs to generate a parity code block, according to an embodiment of the disclosure.

FIG. 7 illustrates an example in which one TB is divided into a plurality of CBs, and a second channel code or outer code is applied to the CBs to generate one or more parity code blocks, according to an embodiment of the disclosure. As described with reference to FIG. 4, one TB may be divided into one or more CBs. In a case where only one CB is generated according to a size of a TB, a CRC may not be added to the CB. When outer code is applied to CBs to be transmitted, parity code blocks 7-40 and 7-42 are generated (operation 7-24). When outer code is used, a parity code block is positioned after a last CB (operation 7-24). After the outer code, CRC 7-26, 7-28, 7-30, 7-32, 7-34, and 7-36 may be added (operation 7-38). Afterward, a CRC and each of CB and parity code block may be encoded with a channel code.

Hereinafter, embodiments of the disclosure will be described in detail with reference to accompanying drawings. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification. In the disclosure, a base station is an entity that allocates resources to a terminal, and may be at least one of a gNode B, an eNode B, a Node B, a base station (BS), a radio access unit, a BS controller, or a node on a network In the disclosure, a terminal may include a UE, a MS, a cellular phone, a smartphone, a computer, or a multimedia system capable of performing a communication function. In the disclosure, a downlink (DL) is a wireless transmission path of a signal transmitted from a BS to a terminal, and an uplink (UL) is a wireless transmission path of a signal transmitted from a terminal to a BS. Also, although the NR system is mentioned as an example in the following descriptions, embodiments of the disclosure may also be applied to other communication systems having similar technical backgrounds or channel types. Also, embodiments of the disclosure are applicable to other communication systems through modification at the discretion of one of ordinary skill in the art without greatly departing from the scope of the disclosure.

In the disclosure, the terms of physical channel and signal according to the related art may be interchangeable used with data or a control signal. For example, a PDSCH refers to a physical channel on which data is transmitted, but in the disclosure, a PDSCH may refer to data.

Hereinafter, in the disclosure, higher layer signaling refers to a method of transmitting a signal from a BS to a terminal by using a DL data channel of a physical layer or transmitting a signal from the terminal to the BS by using a UL data channel of a physical channel, and may also be referred to as RRC signaling or a MAC CE.

In an embodiment below, provided are a method and apparatus for performing transmission and reception of data by applying outer code, between a BS and a terminal or between terminals. In this case, a case in which data is transmitted from one terminal to a plurality of terminals may be referred, or another case in which data is transmitted from one terminal to the other terminal may be referred. Alternatively, a case in which data is transmitted from a BS to a plurality of terminals may be referred. However, the disclosure is not limited thereto, and may be applied to various cases.

Figure 8:
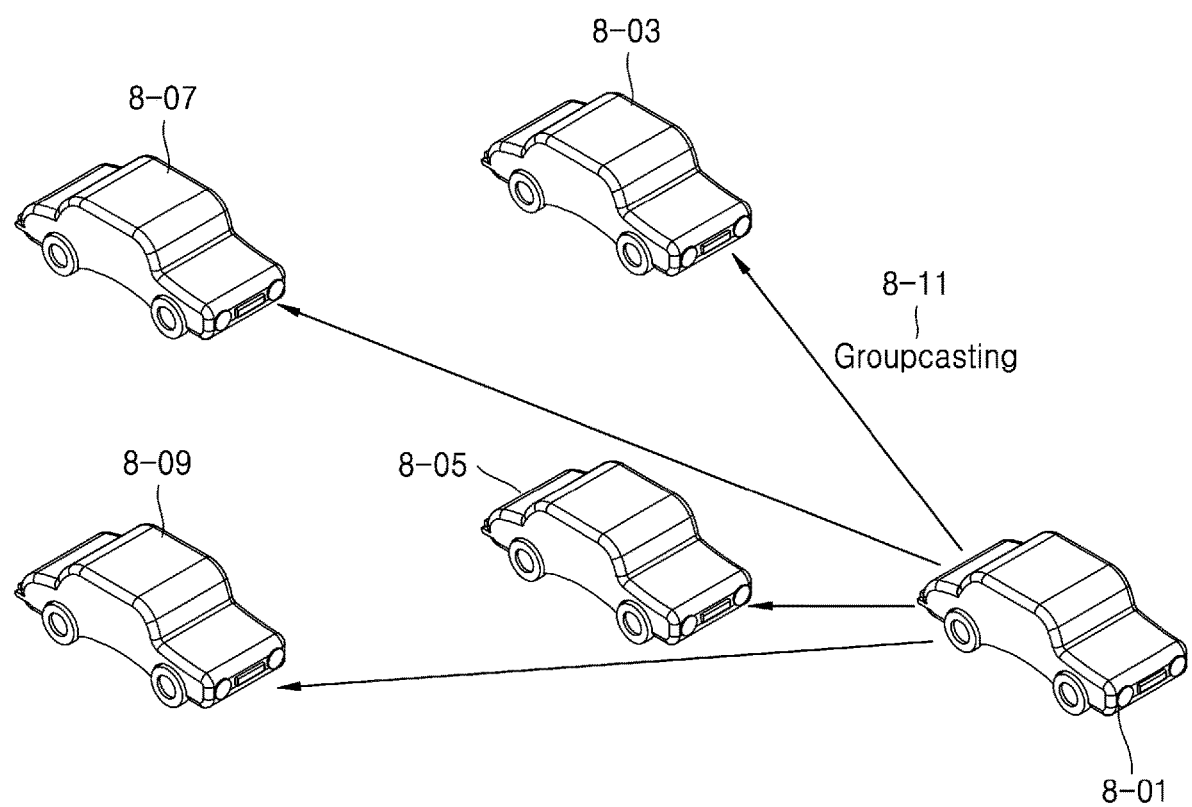
FIG. 8 is a diagram illustrating an example of groupcasting in which one terminal transmits common data to a plurality of terminals, according to an embodiment of the disclosure.

FIG. 8 is a diagram illustrating an example of groupcasting 8-11 in which one terminal 8-01 transmits common data to a plurality of terminals 8-03, 8-05, 8-07, and 8-09, according to an embodiment of the disclosure. Referring to FIG. 8, a terminal may refer to a terminal moving with a vehicle. For groupcasting, separate transmission of control information, a physical control channel, and data may be performed.

Figure 9:
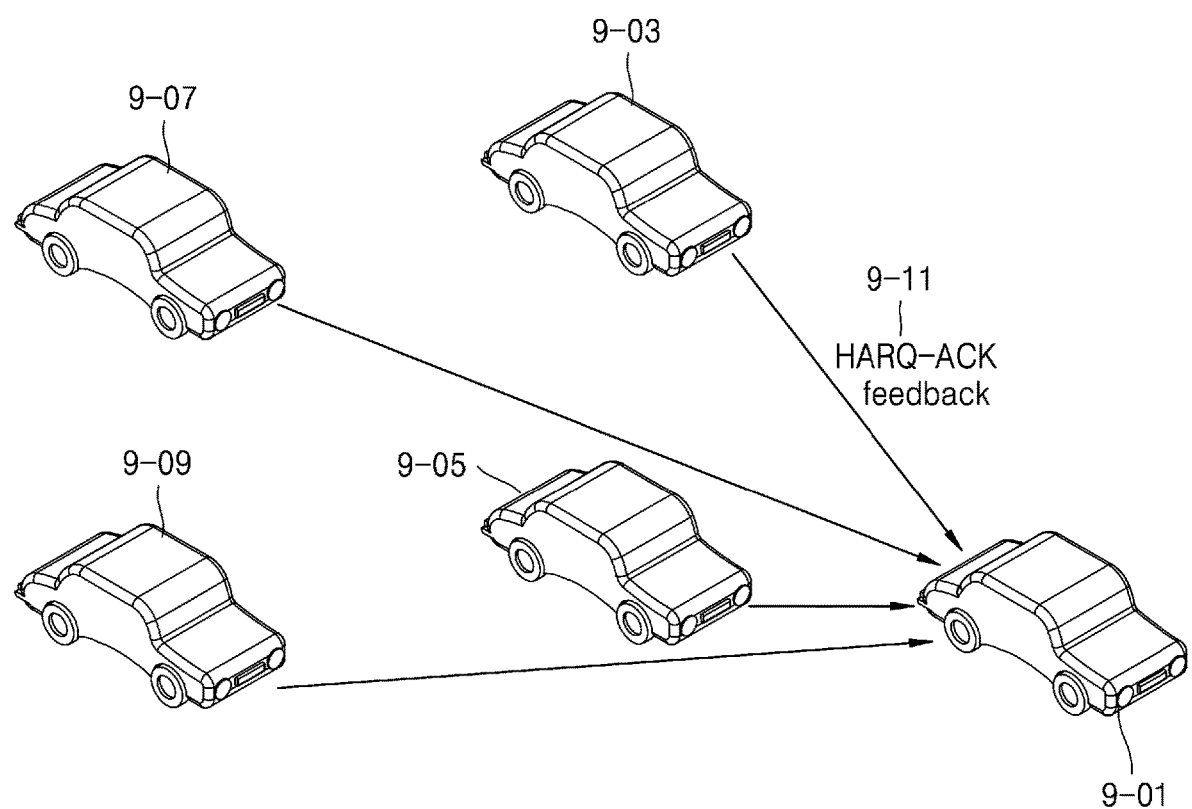
FIG. 9 is a diagram illustrating a procedure in which terminals having received common data via groupcasting transmit information related to success or failure of data reception to a terminal that transmitted the data, according to an embodiment of the disclosure.

FIG. 9 is a diagram illustrating a procedure in which terminals 9-03, 9-05, 9-07, and 9-09 having received common data via groupcasting transmit information related to success or failure of data reception to a terminal 9-01 that transmitted the data, according to an embodiment of the disclosure. The information related to success or failure of data reception may refer to information such as HARQ-ACK feedback 9-11.

In embodiments of the disclosure, a terminal may exist in various forms including a vehicle, a pedestrian, an apparatus, or the like.

Embodiment 1

In Embodiment 1, a scheduling method using two or more MCSs in transmission of one PDSCH, a method of receiving and interpreting corresponding scheduling DCI, and an apparatus therefor will now be described with reference to FIGS. 10 and 11.

Figure 10:
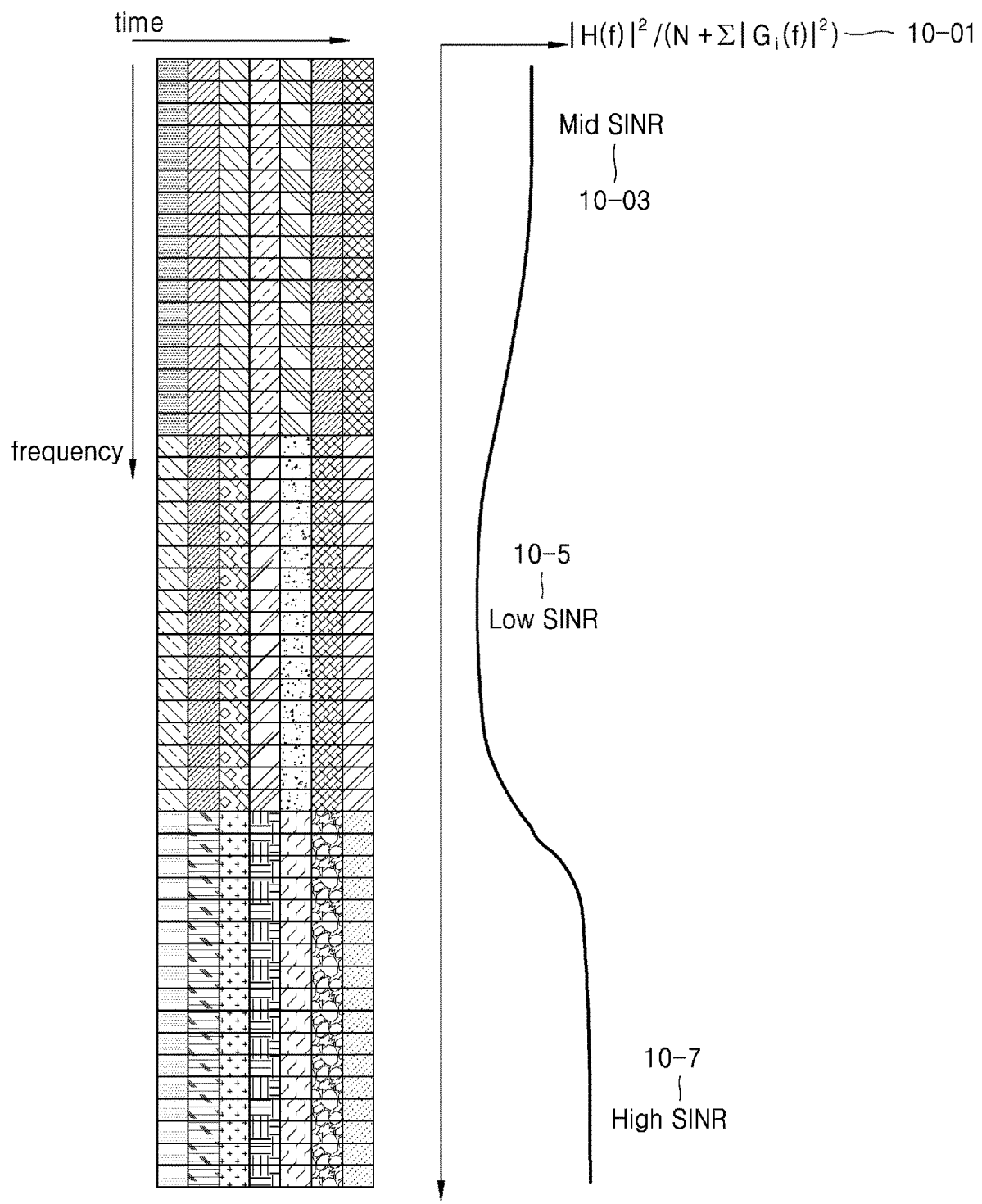
FIG. 10 is a diagram illustrating an example in which a frequency channel condition varies depending on frequencies, according to an embodiment of the disclosure.

FIG. 10 is a diagram illustrating a frequency response power of a radio channel from a transmitter to a receiver, according to an embodiment of the disclosure. When a transmit power and a transmit code rate are determined according to a channel response power in a frequency domain, a data rate may be increased. For example, when a reception Signal to Interference plus Noise Ratio (SINR) 10-01 of a whole frequency band is obtained, a sub-band 110-03 may refer to a domain having a middle SINR, a sub-band 210-05 may refer to a domain having a low SINR, and a sub-band 310-07 may refer to a domain having a high SINR. In this regard, a transfer rate may be increased by highly allocating a transmit power to a sub-band having a high SINR, performing channel coding with a high modulation order and a high code rate, and transmitting data.

However, in the legacy LTE and NR systems, one TB including a plurality of CBs is mapped to an entirely-allocated frequency band, and coding is performed using one value for a MCS. Therefore, a probability of transmission failure of a CB mapped to a frequency band having a low SINR is increased.

In order to solve this problem, one PDSCH may include a plurality of TBs, and the TBs may be mapped to different frequency bands to be transmitted. FIG. 11 illustrates an example in which two TBs are simultaneously transmitted and mapped to different frequency bands. TB 111-01 and TB 211-03 may be mapped to frequency bands that do not overlap with each other. For example, assuming that TB 1 is mapped to a domain having a high reception SINR and TB 2 is mapped to a domain having a low reception SINR, TB 1 and TB 2 may be respectively coded with a high MCS and a low MCS and then transmitted.

In order to transmit two TBs to which different MCSs are applied in one PDSCH transmission, interpretation of resource allocation and MCS for each TB may be requested for scheduling DCI. That is, bit fields as below may be indicated for each TB in scheduling DCI.

Frequency domain resource allocation: An indicator to indicate a RB of a frequency domain allocated to transmission of data. Representation of a resource is determined according to a system bandwidth and a resource allocation scheme.

HARQ process number: An indicator to indicate a process number of HARQ.

TB1: Modulation and coding scheme (MCS): An indicator to indicate a modulation scheme and a coding rate used in transmission of data. That is, information about whether it is QPSK, 16QAM, 64QAM, or 256QAM, and a coding rate value capable of indicating TBS and channel coding information may be indicated.

TB1: New data indicator (NDI): An indicator to indicate whether it is HARQ initial transmission or retransmission.

TB1: Redundancy version (RV): An indicator to indicate a redundancy version of HARQ.

TB2: MCS: An indicator to indicate a modulation scheme and a coding rate used in transmission of data. That is, information about whether it is QPSK, 16QAM, 64QAM, or 256QAM, and a coding rate value capable of indicating TBS and channel coding information may be indicated.

TB2: NDI: An indicator to indicate whether it is HARQ initial transmission or retransmission.

TB2: RV: An indicator to indicate a redundancy version of HARQ.

As described above, MCS, NDI, and RV may be indicated for each TB, but resource allocation and HARQ process ID may be commonly indicated for two TBs.

Figure 12:
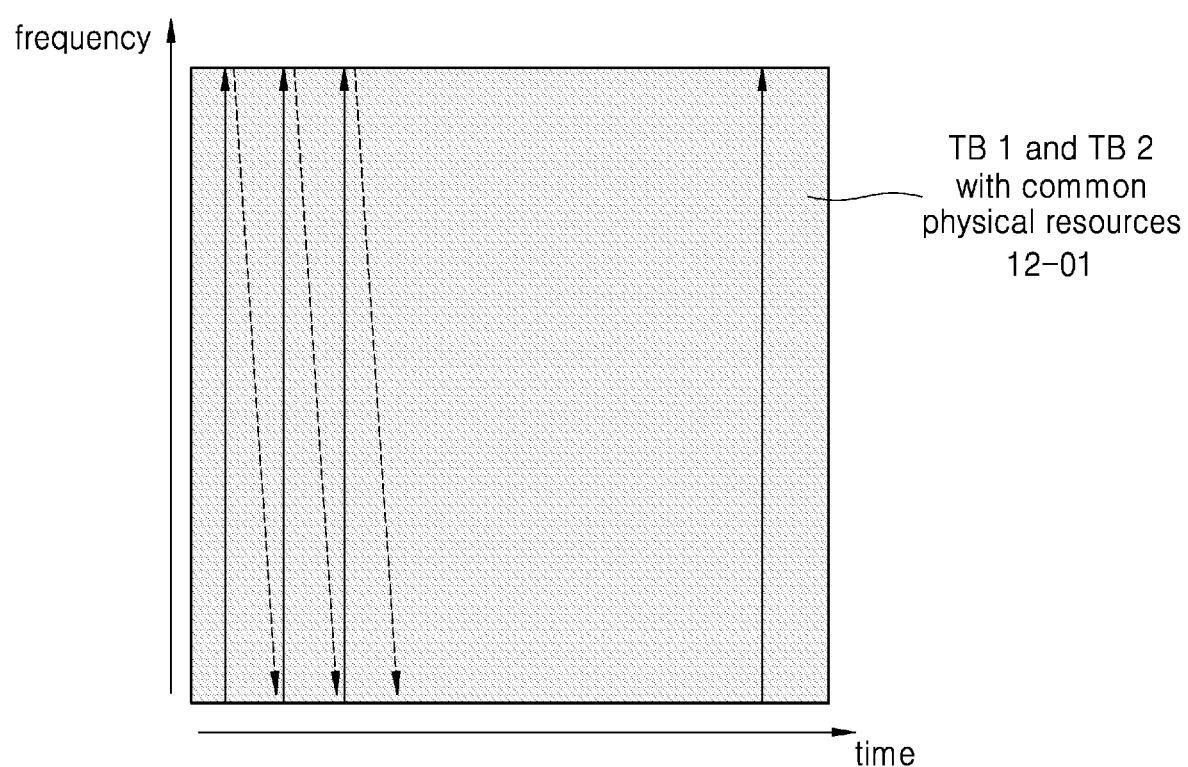
FIG. 12 illustrates an example in which two TBs are mapped to a same resource, according to Embodiment 1 of the disclosure.

A DCI format is used to transmit two TBs by using a multi-antenna technique in the legacy LTE or NR, and resource allocation for TB1 and TB2 in this case is illustrated in FIG. 12. As illustrated in FIG. 12, with respect to resource allocation for transmission of two TBs on one PDSCH in the legacy LTE or NR, the two TBs are mapped to a same resource (12-01) and are transmitted.

Figure 11:
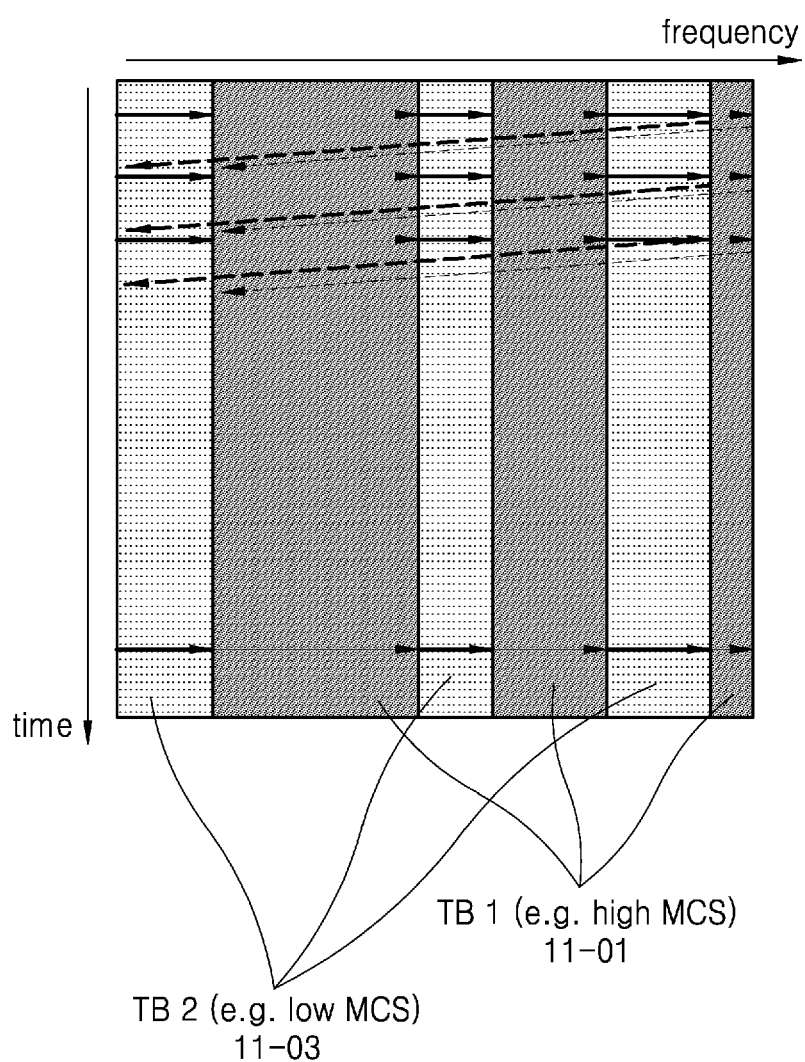
FIG. 11 illustrates an example in which two TBs are mapped to different resources, according to Embodiment 1 of the disclosure.

Unlike this, the disclosure provides a method by which a first TB and a second TB are mapped to different physical resources and are transmitted, as illustrated in FIG. 11. Therefore, a BS or a node performing scheduling has to indicate each of physical resource regions to which TB 1 and TB 2 are mapped.

According to an embodiment, in a case where the BS configures two-TB transmission to a terminal and indicates TBs to be mapped to different resources and to be transmitted, via higher layer signaling or a particular bit field of DCI, when a frequency domain resource allocation field is interpreted in a DCI format, a resource allocation unit may be doubled for interpretation.

Figure 13:
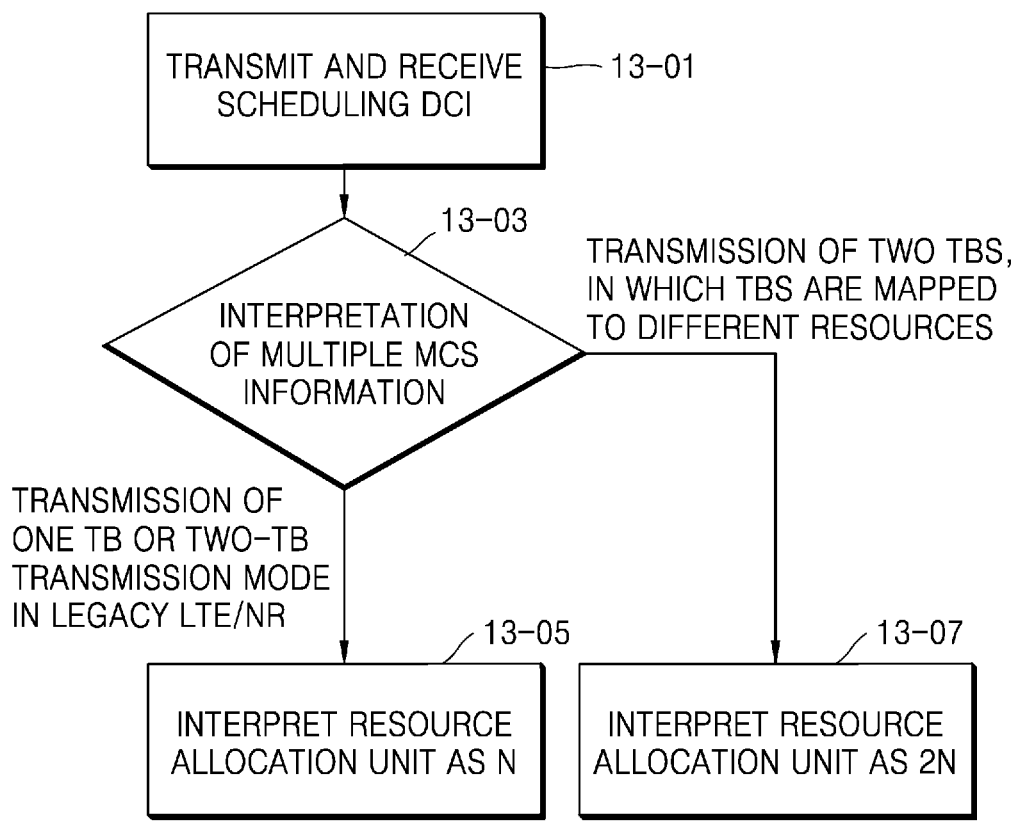
FIG. 13 is a flowchart of a TB mapping mode determining method, according to Embodiment 1 of the disclosure.
Figure 14:
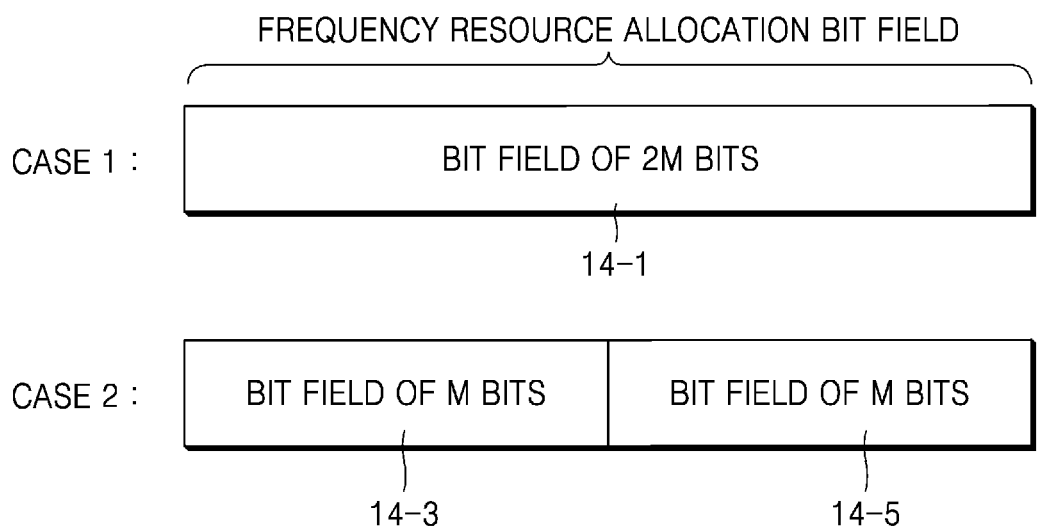
FIG. 14 illustrates a configuration of a resource allocation bit field in control information according to a TB mapping mode, according to Embodiment 1 of the disclosure.

FIG. 13 is a flowchart of a TB mapping mode determining method, according to an embodiment of the disclosure. A BS and a terminal transmit and receive scheduling DCI (operation 13-01), and the terminal interprets multiple MCS information indicating whether TBs are mapped to different resources in two-TB transmission (operation 13-03). The multiple MCS information may be interpreted according to a value configured via higher layer signaling or a particular bit field of the DCI. When the information indicates a transmission mode of two TBs, in which TBs are mapped to different resources (which corresponds to Case 2 below), a frequency resource allocation unit is interpreted as 2N (operation 13-07). In a case of a transmission mode of one TB or a two-TB transmission mode in which TBs are mapped to a same resource as in a legacy manner (which corresponds to Case 1 below), a frequency resource allocation unit may be interpreted as N (operation 13-05). N may be a value that varies according to a system frequency band or a size of a bandwidth part. Therefore, in Case 1, a bit field having 2M bits of a DCI frequency resource allocation bit indicates a frequency physical resource for both TB1 and TB2 (operation 14-01), and in Case 2, DCI frequency resource allocation is performed in a manner that one bit field having M bits indicates a frequency physical resource for TB1 (operation 14-03) and the other bit field having M bits indicates a frequency physical resource for TB2 (operation 14-05). That is, a frequency allocation interpretation unit may be changed depending on transmission modes.

For example, 1 bit of a particular bit field of DCI may indicate whether scheduling is based on a transmission mode of one TB, or scheduling is based on a transmission mode of two TBs in which TBs are mapped to different resources. When 1 bit of the particular bit field of the DCI is 0, the terminal may determine that scheduling is based on the transmission mode of one TB and may interpret a frequency resource allocation unit as N, and a bit field having a size of 2M bits which is DCI frequency resource allocation bit may be a scheduled frequency resource for TB. When 1 bit of the particular bit field is 1, the terminal may determine that scheduling is based on the transmission mode of two TBs in which TBs are mapped to different resources and may interpret a frequency resource allocation unit as 2N, and one bit field having M bits among the DCI frequency resource allocation bit may indicate a frequency physical resource for TB1 and the other bit field having M bits may indicate a frequency physical resource for TB2.

In the present embodiment, descriptions are provided with respect to frequency resource allocation, but the present embodiment may also be applied to time resource allocation. That is, in order to allocate a time resource, a transmission mode of one TB may have one bit field of 2M bits and N time resource allocation units, and a transmission mode of two TBs may have two bit fields of M bits and 2N time resource allocation units.

Embodiment 2

In Embodiment 2, provided is a method of transmitting two TBs by allocating the two TBs to different frequency resources by using a two-step DCI scheme of scheduling one PDSCH by combining a plurality of pieces of information of two pieces of DCI.

Figure 15:
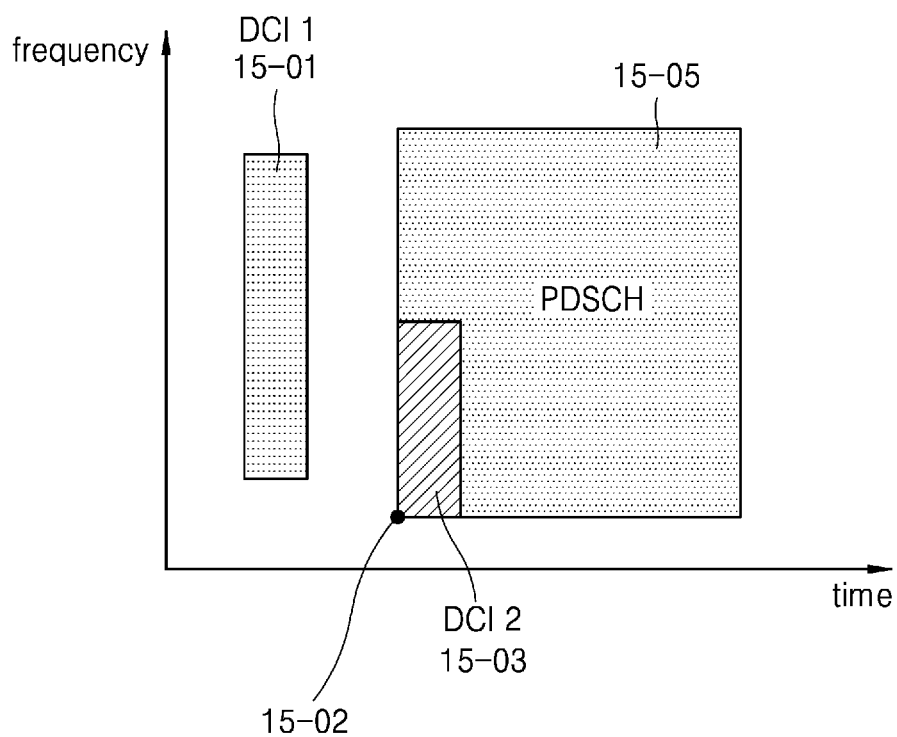
FIG. 15 illustrates scheduling performed by using a two-step DCI scheme, according to Embodiment 2 of the disclosure.

FIG. 15 illustrates an example in which two pieces of DCI schedule one PDSCH. DCI 1 15-01 that is first DCI may include at least one or more of a plurality of pieces of information below.

Information of a frequency resource on which DCI 2 15-03 or the DCI 2 15-03 and a PDSCH 15-05 are to be transmitted. It may be information of all frequency resources or may indicate a start point 15-02 of a frequency resource.

HARQ process number: indicates a process number of HARQ.

Time domain resource allocation: Position information of a slot and a symbol on which the second DCI 15-03 or the second DCI 15-03 and the PDSCH 15-05 are to be transmitted may be included.

TB transmission mode indicator: One bit indicator to indicate whether data to be transmitted on a PDSCH is scheduled for a transmission mode of one TB or is scheduled for a transmission mode of two TBs in which TBs are mapped to different resources. This may be normalized to a bit field having a size greater than one bit. That is, when a mode in which N TBs are transmitted can be indicated, $\lceil \log_2 N \rceil$ bits may be required for a size of a bit field.

A terminal may receive the DCI 1 15-01, and may decode the DCI 2 15-03 by using the information included in the DCI 1 15-01. For example, a position of a resource to which the DCI 2 15-03 is mapped may be indicated by decoding the DCI 1 15-01, a size of the DCI 2 15-03 may be changed according to the information of the DCI 1 15-01, and the terminal may detect the size of the DCI 2 15-03 so as to use it in decoding. The DCI 2 15-03 may include at least one or more of a plurality of pieces of information below.

Frequency domain resource allocation: An indicator to indicate a RB of a frequency domain allocated to transmission of data. Representation of a resource is determined according to a system bandwidth and a resource allocation scheme.

TB1: Modulation and coding scheme (MCS): indicates a modulation scheme and a coding rate used in transmission of data. That is, information about whether it is QPSK, 16QAM, 64QAM, or 256QAM, and a coding rate value capable of indicating TBS and channel coding information may be indicated.

TB1: New data indicator (NDI): indicates whether it is HARQ initial transmission or retransmission.

TB1: Redundancy version (RV): indicates a redundancy version of HARQ.

TB2: MCS: indicates a modulation scheme and a coding rate used in transmission of data. That is, information about whether it is QPSK, 16QAM, 64QAM, or 256QAM, and a coding rate value capable of indicating TBS and channel coding information may be indicated.

TB2: NDI: indicates whether it is HARQ initial transmission or retransmission.

TB2: RV: indicates a redundancy version of HARQ.

Information related to TB2 may not exist, according to information of a TB transmission mode indicator indicated in DCI 1.

Also, when it is a transmission mode of two TBs, in which TBs are mapped to different resources, a frequency resource allocation unit of a frequency resource allocation bit field may be interpreted as 2N. In a case of a transmission mode of one TB or a two-TB transmission mode in which TBs are mapped to a same resource as in a legacy manner, a frequency resource allocation unit may be interpreted as N. N may be a value that varies according to a system frequency band or a size of a bandwidth part. Therefore, in the two-TB transmission mode in which TBs are mapped to a same resource as in a legacy manner, a bit field having a size of 2M bits which is a DCI frequency resource allocation bit indicates a frequency physical resource for both TB1 and TB2.

Also, according to an embodiment, provided is a method by which a length of a frequency resource allocation bit field existing in the DCI 2 15-03 is determined based on the number of TBs indicated by the DCI 1 15-01. That is, when the number of TBs indicated by the DCI 1 15-01 is 1, the DCI 2 15-03 may include only information of TB1, and a frequency resource allocation bit field may include M bits for resource allocation for TB1. When the number of TBs indicated by the DCI 1 15-01 is 2, the DCI 2 15-03 may include only information of TB 1 and TB 2, and a frequency resource allocation bit field may include M bits for resource allocation for TB1 and M bits for resource allocation for TB2. This may be normalized and applied as a case where the number of TBs indicated by the DCI 1 15-01 is N.

Embodiment 3

In Embodiment 3, provided is a method of determining a TB transmission mode according to the number of layers to which a PDSCH to be transmitted in a DL is mapped.

When a BS transmits a DL to a terminal, the BS may transmit a PDSCH by mapping the PDSCH to one or more layers.

Table 2 below defines a mapping method between TB and layer according to the related art. In Table below, codeword indicates TB. $x^{(a)}(i)$ may refer to $i^{th}$ data symbol mapped to $a^{th}$ layer, and $d^{(b)}(i)$ may refer to $i^{th}$ data symbol of $b^{th}$ TB or codeword. As in Table 2, when the number of layers is 1 to 4, only one TB may be mapped, and when the number of layers is 5 to 8, two TBs may be divided by a total number of layers and mapped. When a layer mapping method as in Table 2 is used and TB 1 and TB 2 are mapped to a same physical resource, $x^{(a)}(i)$ may be mapped in an overlapping manner to same resources and transmitted. That is, TB 1 and TB 2 may be mapped as in 12-01 of FIG. 12.

TABLE 2

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |

TABLE 2-continued

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ | $M_{symb}^{layer} = M_{symb}^{(0)}/2$ |
|  |  | $x^{(1)}(i) = d^{(0)}(2i + 1)$ |  |
| 3 | 1 | $x^{(0)}(i) = d^{(0)}(3i)$ | $M_{symb}^{layer} = M_{symb}^{(0)}/3$ |
|  |  | $x^{(1)}(i) = d^{(0)}(3i + 1)$ |  |
|  |  | $x^{(2)}(i) = d^{(0)}(3i + 2)$ |  |
| 4 | 1 | $x^{(0)}(i) = d^{(0)}(4i)$ | $M_{symb}^{layer} = M_{symb}^{(0)}/4$ |
|  |  | $x^{(1)}(i) = d^{(0)}(4i + 1)$ |  |
|  |  | $x^{(2)}(i) = d^{(0)}(4i + 2)$ |  |
|  |  | $x^{(3)}(i) = d^{(0)}(4i + 3)$ |  |
| 5 | 2 | $x^{(0)}(i) = d^{(0)}(2i)$ | $M_{symb}^{layer} = M_{symb}^{(0)}/2 = M_{symb}^{(1)}/3$ |
|  |  | $x^{(1)}(i) = d^{(0)}(2i + 1)$ |  |
|  |  | $x^{(2)}(i) = d^{(1)}(3i)$ |  |
|  |  | $x^{(3)}(i) = d^{(1)}(3i + 1)$ |  |
|  |  | $x^{(4)}(i) = d^{(1)}(3i + 2)$ |  |
| 6 | 2 | $x^{(0)}(i) = d^{(0)}(3i)$ | $M_{symb}^{layer} = M_{symb}^{(0)}/3 = M_{symb}^{(1)}/3$ |
|  |  | $x^{(1)}(i) = d^{(0)}(3i + 1)$ |  |
|  |  | $x^{(2)}(i) = d^{(0)}(3i + 2)$ |  |
|  |  | $x^{(3)}(i) = d^{(1)}(3i)$ |  |
|  |  | $x^{(4)}(i) = d^{(1)}(3i + 1)$ |  |
|  |  | $x^{(5)}(i) = d^{(1)}(3i + 2)$ |  |
| 7 | 2 | $x^{(0)}(i) = d^{(0)}(3i)$ | $M_{symb}^{layer} = M_{symb}^{(0)}/3 = M_{symb}^{(1)}/4$ |
|  |  | $x^{(1)}(i) = d^{(0)}(3i + 1)$ |  |
|  |  | $x^{(2)}(i) = d^{(0)}(3i + 2)$ |  |
|  |  | $x^{(3)}(i) = d^{(1)}(4i)$ |  |
|  |  | $x^{(4)}(i) = d^{(1)}(4i + 1)$ |  |
|  |  | $x^{(5)}(i) = d^{(1)}(4i + 2)$ |  |
|  |  | $x^{(6)}(i) = d^{(1)}(4i + 3)$ |  |
| 8 | 2 | $x^{(0)}(i) = d^{(0)}(4i)$ | $M_{symb}^{layer} = M_{symb}^{(0)}/4 = M_{symb}^{(1)}/4$ |
|  |  | $x^{(1)}(i) = d^{(0)}(4i + 1)$ |  |
|  |  | $x^{(2)}(i) = d^{(0)}(4i + 2)$ |  |
|  |  | $x^{(3)}(i) = d^{(0)}(4i + 3)$ |  |
|  |  | $x^{(4)}(i) = d^{(1)}(4i)$ |  |
|  |  | $x^{(5)}(i) = d^{(1)}(4i + 1)$ |  |
|  |  | $x^{(6)}(i) = d^{(1)}(4i + 2)$ |  |
|  |  | $x^{(7)}(i) = d^{(1)}(4i + 3)$ |  |

Table 3 below defines a mapping method between TB and layer according to some embodiments of the disclosure, in which different methods are applied to two-TB transmissions divided by the number of layers. In Table below, codeword indicates TB. $x_{(b)}^{(a)}(i)$ refers to $i^{th}$ data symbol of $b^{th}$ TB mapped to $a^{th}$ layer, and $d^{(b)}(i$ refers to $i^{th}$ data symbol of $b^{th}$ TB or codeword. $x_{(0)}^{(a)}(i)$ and $x_{(1)}^{(a)}(i)$ may be respectively mapped to different physical resources, for example, may be mapped to physical resources that do not overlap with each other as in 11-01 and 11-03 of FIG. 11 and transmitted. In four or more layers, TB transmission may be switched to a method of transmitting two TBs by mapping the two TBs to a same resource. That is, the two TBs may be mapped as in 12-01 of FIG. 12. $x^{(a)}(i)$ refers to $i^{th}$ data symbol mapped to $a^{th}$ layer.

TABLE 3

| Number of layers | Number of codewords | Codeword-to-layer mapping $i = 0, 1, \ldots, M_{symb}^{layer} - 1$ | |
|---|---|---|---|
| 1 | 2 | $x_{(0)}^{(0)}(i) = d^{(0)}(i)$ | $M_{symb}^{layer} = M_{symb}^{(0)}$ |
|  |  | $x_{(0)}^{(0)}(i) = d^{(1)}(i)$ |  |
| 2 | 2 | $x_{(0)}^{(0)}(i) = d^{(0)}(2i)$ | $M_{symb}^{layer} = M_{symb}^{(0)}/2$ |
|  |  | $x_{(0)}^{(1)}(i) = d^{(0)}(2i + 1)$ |  |
|  |  | $x_{(1)}^{(0)}(i) = d^{(1)}(2i)$ |  |
|  |  | $x_{(1)}^{(1)}(i) = d^{(1)}(2i + 1)$ |  |
| 3 | 2 | $x_{(0)}^{(0)}(i) = d^{(0)}(3i)$ | $M_{symb}^{layer} = M_{symb}^{(0)}/3$ |
|  |  | $x_{(0)}^{(1)}(i) = d^{(0)}(3i + 1)$ |  |
|  |  | $x_{(0)}^{(2)}(i) = d^{(0)}(3i + 2)$ |  |
|  |  | $x_{(1)}^{(0)}(i) = d^{(1)}(3i)$ |  |
|  |  | $x_{(1)}^{(1)}(i) = d^{(1)}(3i + 1)$ |  |
|  |  | $x_{(1)}^{(2)}(i) = d^{(1)}(3i + 2)$ |  |
| 4 | 2 | $x_{(0)}^{(0)}(i) = d^{(0)}(4i)$ | $M_{symb}^{layer} = M_{symb}^{(0)}/4$ |
|  |  | $x_{(0)}^{(1)}(i) = d^{(0)}(4i + 1)$ |  |

TABLE 3-continued

| Number of layers | Number of codewords | Codeword-to-layer mapping $i = 0, 1, \ldots, M_{symb}^{layer} - 1$ | |
|---|---|---|---|
| | | $x_{(0)}^{(2)}(i) = d^{(0)}(4i + 2)$ | |
| | | $x_{(0)}^{(3)}(i) = d^{(0)}(4i + 3)$ | |
| | | $x_{(1)}^{(0)}(i) = d^{(1)}(4i)$ | |
| | | $x_{(1)}^{(1)}(i) = d^{(1)}(4i + 1)$ | |
| | | $x_{(1)}^{(2)}(i) = d^{(1)}(4i + 2)$ | |
| | | $x_{(1)}^{(3)}(i) = d^{(1)}(4i + 3)$ | |
| 5 | 2 | $x^{(0)}(i) = d^{(0)}(2i)$ | $M_{symb}^{layer} =$ |
| | | $x^{(1)}(i) = d^{(0)}(2i + 1)$ | $M_{symb}^{(0)}/2 =$ |
| | | $x^{(2)}(i) = d^{(1)}(3i)$ | $M_{symb}^{(1)}/3$ |
| | | $x^{(3)}(i) = d^{(1)}(3i + 1)$ | |
| | | $x^{(4)}(i) = d^{(1)}(3i + 2)$ | |
| 6 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 =$ |
| | | $x^{(2)}(i) = d^{(0)}(3i + 2)$ | $M_{symb}^{(1)}/3$ |
| | | $x^{(3)}(i) = d^{(1)}(3i)$ | |
| | | $x^{(4)}(i) = d^{(1)}(3i + 1)$ | |
| | | $x^{(5)}(i) = d^{(1)}(3i + 2)$ | |
| 7 | 2 | $x^{(0)}(i) = d^{(0)}(3i)$ | $M_{symb}^{layer} =$ |
| | | $x^{(1)}(i) = d^{(0)}(3i + 1)$ | $M_{symb}^{(0)}/3 =$ |
| | | $x^{(2)}(i) = d^{(0)}(3i + 2)$ | $M_{symb}^{(1)}/4$ |
| | | $x^{(3)}(i) = d^{(1)}(4i)$ | |
| | | $x^{(4)}(i) = d^{(1)}(4i + 1)$ | |
| | | $x^{(5)}(i) = d^{(1)}(4i + 2)$ | |
| | | $x^{(6)}(i) = d^{(1)}(4i + 3)$ | |
| 8 | 2 | $x^{(0)}(i) = d^{(0)}(4i)$ | $M_{symb}^{layer} =$ |
| | | $x^{(1)}(i) = d^{(0)}(4i + 1)$ | $M_{symb}^{(0)}/4 =$ |
| | | $x^{(2)}(i) = d^{(0)}(4i + 2)$ | $M_{symb}^{(1)}/4$ |
| | | $x^{(3)}(i) = d^{(0)}(4i + 3)$ | |
| | | $x^{(4)}(i) = d^{(1)}(4i)$ | |
| | | $x^{(5)}(i) = d^{(1)}(4i + 1)$ | |
| | | $x^{(6)}(i) = d^{(1)}(4i + 2)$ | |
| | | $x^{(7)}(i) = d^{(1)}(4i + 3)$ | |

When the BS transmits data to the terminal, the BS may add information of the number of layers to control information DCI for scheduling and may transmit the DCI, and according to the number of layers, and may transmit two TBs by using a layer mapping method, e.g., Table 3 in the example above.

Figure 16:
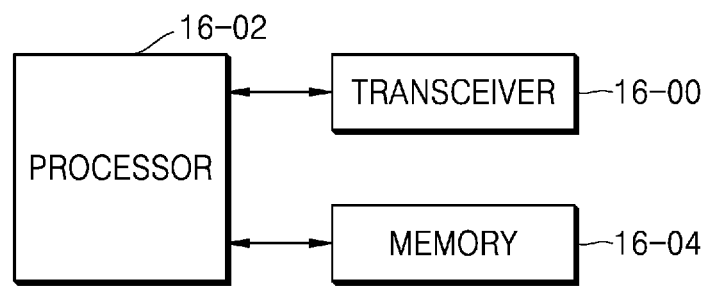
FIG. 16 is a block diagram illustrating an inner structure of a terminal, according to an embodiment of the disclosure.
Figure 17:
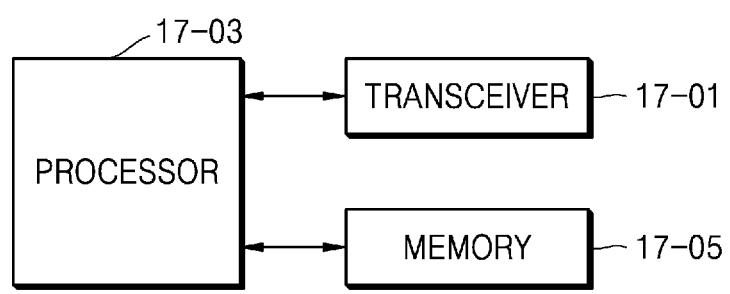
FIG. 17 is a block diagram illustrating an inner structure of a base station, according to an embodiment of the disclosure.

In order to perform the aforementioned embodiments of the disclosure, a transceiver, a memory, and a processor of each of a terminal and a BS are illustrated in FIGS. 16 and 17. As described in embodiments, provided is a transmitting and receiving method performed by the BS and the terminal to perform a communication method using multiple MCSs, in which an interpretation unit of a frequency resource allocation field is determined based on a TB transmission mode, and in order to perform the method, a transceiver, a memory, and a processor of each of the BS and the terminal may operate according to embodiments.

In particular, FIG. 16 is a block diagram illustrating an inner structure of a terminal, according to an embodiment of the disclosure. As illustrated in FIG. 16, the terminal of the disclosure may include a transceiver 16-00, a memory 16-04, and a processor 16-02 of the terminal. However, the configuration of the terminal is not limited to the example, and the terminal may include fewer elements or more elements than the elements illustrated in FIG. 16.

The transceiver 16-00 may transmit or receive a signal to or from a BS. The signal transmitted or received to or from the BS may include control information and data. The transceiver 16-00 may include a RF transmitter configured to up-convert and amplify a frequency of a transmitted signal, and a RF receiver configured to low-noise amplify a received signal and down-convert a frequency thereof. However, the configuration of the transceiver 16-00 is not limited to the example above. Also, the transceiver 16-00 may receive a signal through a radio channel and output the signal to the processor 16-02, and may transmit, through a radio channel, a signal output from the processor 16-02. The processor 16-02 may control a series of processes to allow the terminal to operate according to the aforementioned embodiment of the disclosure. For example, the transceiver 16-00 may receive data and control information from the BS, and the processor 16-02 may detect a TB mapping method included in the data, according to the control information. Afterward, the transceiver 16-00 may transmit feedback on the data to the BS.

Also, according to an embodiment, in order to determine an interpretation unit for a frequency resource allocation field, based on a TB transmission mode, the processor 16-02 may control the transceiver 16-00 and the memory 16-04 to receive at least one DCI, to obtain, based on the received at least one DCI, transport block transmission mode information that is information about whether a plurality of transport blocks are mapped to different resources, and to determine an interpretation unit for resource allocation information of the plurality of transport blocks, based on the obtained transport block transmission mode information.

The memory 16-04 stores basic programs, application programs, and data, e.g., configuration information, for operations of the terminal. The memory 16-04 provides the stored data upon request by the processor 16-02. The memory 16-04 may include any or a combination of storage media such as read-only memory (ROM), random access memory (RAM), a hard disk, a compact disc (CD)-ROM, and a digital versatile disc (DVD). Also, the memory 16-04 may refer to a plurality of memories. The memory 16-04 may store a program for executing the aforementioned method.

The processor 16-02 controls overall operations of the terminal. For example, the processor 16-02 transmits or receives data through the transceiver 16-00. Also, the processor 16-02 records and reads data on or from the memory 16-04. The processor 16-02 may include at least one processor, and may include a communication processor (CP) for controlling communications and an application processor (AP) for controlling a higher layer such as an application program. According to an embodiment of the disclosure, the processor 16-02 may control the terminal to perform the aforementioned operations. At least one element in the terminal may be implemented as a chip.

FIG. 17 is a block diagram illustrating an inner structure of a BS, according to an embodiment of the disclosure. As illustrated in FIG. 17, the BS of the disclosure may include a transceiver 17-01, a memory 17-05, and a processor 17-03. However, the configuration of the BS is not limited to the example, and the BS may include fewer elements or more elements than the elements illustrated in FIG. 17.

The transceiver 17-01 may transmit or receive a signal to or from a terminal. The signal transmitted or received to or from the terminal may include control information and data. The transceiver 17-01 may include a RF transmitter configured to up-convert and amplify a frequency of a transmitted signal, and a RF receiver configured to low-noise amplify a received signal and down-convert a frequency thereof. However, the configuration of the transceiver 17-01 is not limited to the example above. Also, the transceiver 17-01 may receive a signal through a radio channel and output the signal to the processor 17-03, and may transmit, through a radio channel, a signal output from the processor 17-03. The processor 17-03 may control a series of processes to allow the terminal to operate according to the aforementioned embodiment of the disclosure. For example, the processor 17-03 may control a TB mapping method to be determined according to a channel condition. Afterward, the transceiver 17-01 may transmit TBs by mapping the TBs according to the determined method, and the transceiver 17-01 may receive, from terminals, feedbacks on transmitted data.

The memory 17-05 stores basic programs, application programs, and data, e.g., configuration information, for operations of the BS. The memory 17-05 provides the stored data upon request by the processor 17-03. The memory 17-05 may include any or a combination of storage media such as ROM, RAM, a hard disk, a CD-ROM, and a DVD. Also, the memory 17-05 may refer to a plurality of memories. The memory 17-05 may store a program for executing the aforementioned method.

The processor 17-03 controls overall operations of the BS. For example, the processor 17-03 transmits or receives data through the transceiver 17-01. Also, the processor 17-03 records and reads data on or from the memory 17-05. To do so, the processor 17-03 may include at least one processor, and may include a CP for controlling communications and an AP for controlling a higher layer such as an application program. According to an embodiment of the disclosure, the processor 17-03 may control the BS to perform the aforementioned operations. At least one element in the terminal may be implemented as a chip.

The methods, according to the embodiments of the disclosure as described herein or in the following claims, may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions causing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access an apparatus that performs embodiments of the disclosure.

In the afore-described embodiments of the disclosure, an element or elements included in the disclosure are expressed in a singular or plural form depending on the described embodiments of the disclosure. However, the singular or plural form is selected appropriately for a situation assumed for convenience of descriptions, the disclosure is not limited to the singular or plural form, and an element expressed in a singular form may include a plurality of elements and elements expressed in a plural form may include a single element.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, Embodiment 1 and Embodiment 3 may be combined with each other to be applied thereto. Also, various modifications based on the technical concept of the embodiments may be applied to the LTE system, the 5G system, or the like.

The invention claimed is:

1. A method, performed by a base station, of transmitting or receiving data, the method comprising:
   determining whether to respectively allocate a plurality of transport blocks (TBs) including a first TB and a second TB to different frequency resource regions, based on frequency channel condition including signal to interference plus noise ratio (SINR);
   determining, based on a result of the determining, at least one frequency resource region to which the first TB and the second TB are allocated, wherein the first TB is coded with a first modulation and coding scheme (MCS) and the second TB is coded with a second MCS;
   transmitting, to a terminal, first downlink control information including an indicator of a transmission mode which indicates whether the first TB and the second TB are allocated to the different frequency resource regions and resource allocation information for the first TB and the second TB; and
   transmitting, to the terminal, the first TB and the second TB in a physical downlink shared channel (PDSCH), based on the transmission mode,
   wherein, in case that the indicator of the transmission mode indicates a first value;
      the resource allocation information includes a first bit field comprising M bits indicating a frequency resource region allocated to the first TB and a second bit field comprising M bits indicating a frequency resource region allocated to the second TB,
      a frequency resource allocation unit is identified as 2N, and
      SINR of the frequency resource region allocated to the first TB is different from SINR of the frequency resource region allocated to the second TB, and
   wherein, in case that the indicator of the transmission mode indicates a second value;
      the resource allocation information includes a third bit field comprising 2M bits indicating a frequency resource region allocated to the first TB and the second TB, and the frequency resource allocation unit is identified as N.

2. The method of claim 1,
   wherein the first downlink control information further includes at least one of information indicating the first MCS for the first TB, information indicating the second MCS for the second TB, a hybrid automatic repeat request (HARQ) process number, a new data indicator, and information of redundancy version.

3. The method of claim 1,
   wherein the first value indicates that the plurality of TBs are allocated to the different frequency resource regions, and
   wherein the second value indicates that the plurality of TBs are allocated to a same frequency resource region.

4. The method of claim 1,
wherein the first downlink control information further includes frequency resource information of second downlink control information, and
wherein the second downlink control information includes at least one of information indicating the first MCS for the first TB, information indicating the second MCS for the second TB, a hybrid automatic repeat request (HARQ) process number, a new data indicator, and information of redundancy version.

5. The method of claim 1, further comprising:
determining whether to respectively allocate the plurality of TBs to different layers,
wherein the first downlink control information further includes information of a number of layers.

6. The method of claim 1,
wherein the indicator of the transmission mode is determined based on information of a number of the plurality of TBs transmitted in the PDSCH, and
wherein the transmission mode is configured via higher layer signaling.

7. A method, performed by a terminal, of transmitting or receiving data, the method comprising:
receiving, from a base station, first downlink control information, wherein the first downlink control information includes an indicator of a transmission mode which indicates whether a plurality of transport blocks (TBs) including a first TB and a second TB are allocated to different frequency resource regions and resource allocation information for the first TB and the second TB;
identifying, based on the received first downlink control information, whether the first TB and the second TB are respectively allocated to the different frequency resource regions; and
receiving, from the base station, the first TB and the second TB in a physical downlink shared channel (PDSCH), based on a result of the identifying,
wherein, whether to respectively allocate the first TB and the second TB to the different frequency resource regions is determined based on frequency channel condition including signal to interference plus noise ratio (SINR),
wherein the first TB is coded with a first modulation and coding scheme (MCS) and the second TB is coded with a second MCS,
wherein, in case that the indicator of the transmission mode indicates a first value;
the resource allocation information includes a first bit field comprising M bits indicating a frequency resource region allocated to the first TB and a second bit field comprising M bits indicating a frequency resource region allocated to the second TB,
a frequency resource allocation unit is identified as 2N, and
SINR of the frequency resource region allocated to the first TB is different from SINR of the frequency resource region allocated to the second TB, and
wherein, in case that the indicator of the transmission mode indicates a second value;
the resource allocation information includes a third bit field comprising 2M bits indicating a frequency resource region allocated to the first TB and the second TB, and
the frequency resource allocation unit is identified as N.

8. The method of claim 7,
wherein the first downlink control information further includes at least one of information indicating the first MCS for the first TB, information indicating the second MCS for the second TB, a hybrid automatic repeat request (HARQ) process number, a new data indicator, and information of redundancy version.

9. The method of claim 7,
wherein the first value indicates that the plurality of TBs are allocated to the different frequency resource regions, and
wherein the second value indicates that the plurality of TBs are allocated to a same frequency resource domain.

10. The method of claim 7,
wherein the first downlink control information further includes frequency resource information of second downlink control information, and
wherein the second downlink control information includes at least one of information indicating the first MCS for the first TB, information indicating the second MCS for the second TB, a hybrid automatic repeat request (HARQ) process number, a new data indicator, and information of redundancy version.

11. The method of claim 7, further comprising:
identifying whether the plurality of TBs are respectively allocated to different layers,
wherein the first downlink control information further includes information of a number of layers.

12. A base station for transmitting or receiving data, the base station comprising:
a transceiver; and
at least one processor coupled with the transceiver and configured to:
determine whether to respectively allocate a plurality of transport blocks (TBs) including a first TB and a second TB to different frequency resource regions, based on frequency channel condition including signal to interference plus noise ratio (SINR),
determine, based on a result of the determining, at least one frequency resource region to which the first TB and the second TB are allocated, wherein the first TB is coded with a first modulation and coding scheme (MCS) and the second TB is coded with a second MCS,
transmit, to a terminal, first downlink control information including an indicator of a transmission mode which indicates whether the first TB and the second TB are allocated to the different frequency resource regions and resource allocation information for the first TB and the second TB, and
transmit, to the terminal, the first TB and the second TB in a physical downlink shared channel (PDSCH), based on the transmission mode,
wherein, in case that the indicator of the transmission mode indicates a first value;
the resource allocation information includes a first bit field comprising M bits indicating a frequency resource region allocated to the first TB and a second bit field comprising M bits indicating a frequency resource region allocated to the second TB,
a frequency resource allocation unit is identified as 2N, and
SINR of the frequency resource region allocated to the first TB is different from SINR of the frequency resource region allocated to the second TB, and wherein, in case that the indicator of the transmission mode indicates a second value;
the resource allocation information includes a third bit field comprising 2M bits indicating a frequency resource region allocated to the first TB and the second TB, and
the frequency resource allocation unit is identified as N.

13. The base station of claim 12,
wherein the first downlink control information further includes frequency resource information of second downlink control information, and
wherein the second downlink control information includes at least one of information indicating the first MCS for the first TB, information indicating the second MCS for the second TB, a hybrid automatic repeat request (HARQ) process number, a new data indicator, and information of redundancy version.

14. The base station of claim 12,
wherein the at least one processor is further configured to determine whether to respectively allocate the plurality of TBs to different layers, and
wherein the first downlink control information further includes information of a number of layers.

15. A terminal for transmitting or receiving data, the terminal comprising:
a transceiver; and
at least one processor coupled with the transceiver and configured to:
receive, from a base station, first downlink control information, wherein the first downlink control information includes an indicator of a transmission mode which indicates whether a plurality of transport blocks (TBs) including a first TB and a second TB are allocated to different frequency resource regions and resource allocation information for the first TB and the second TB,
identify, based on the received first downlink control information, whether the first TB and the second TB are respectively allocated to the different frequency resource regions, and
receive, from the base station, the first TB and the second TB in a physical downlink shared channel (PDSCH), based on a result of the identifying,
wherein, whether to respectively allocate the first TB and the second TB to the different frequency resource regions is determined based on frequency channel condition including signal to interference plus noise ratio (SINR),
wherein the first TB is coded with a first modulation and coding scheme (MCS) and the second TB is coded with a second MCS,
wherein, in case that the indicator of the transmission mode indicates a first value,
the resource allocation information includes a first bit field comprising M bits indicating a frequency resource region allocated to the first TB and a second bit field comprising M bits indicating a frequency resource region allocated to the second TB, and
a frequency resource allocation unit is identified as 2N, and
SINR of the frequency resource region allocated to the first TB is different from SINR of the frequency resource region allocated to the second TB, and
wherein, in case that the indicator of the transmission mode indicates a second value,
the resource allocation information includes a third bit field comprising 2M bits indicating a frequency resource region allocated to the first TB and the second TB, and
the frequency resource allocation unit is identified as N.

16. The terminal of claim 15,
wherein the first downlink control information further includes at least one of information indicating the first MCS for the first TB, information indicating the second MCS for the second TB, a hybrid automatic repeat request (HARQ) process number, a new data indicator, and information of redundancy version.

17. The terminal of claim 15,
wherein the first value indicates that the plurality of TBs are allocated to the different frequency resource regions, and
wherein the second value indicates that the plurality of TBs are allocated to a same frequency resource domain.

18. The terminal of claim 15,
wherein the first downlink control information further includes frequency resource information of second downlink control information, and
wherein the second downlink control information includes at least one of information indicating the first MCS for the first TB, information indicating the second MCS for the second TB, a hybrid automatic repeat request (HARQ) process number, a new data indicator, and information of redundancy version.

19. The terminal of claim 15, wherein the at least one processor is further configured to:
identify whether the plurality of TBs are respectively allocated to different layers,
wherein the first downlink control information further includes information of a number of layers.

20. The base station of claim 12,
wherein the first downlink control information further includes at least one of information indicating the first MCS for the first TB, information indicating the second MCS for the second TB, a hybrid automatic repeat request (HARQ) process number, a new data indicator, and information of redundancy version.

* * * * *